US012739464B1

(12) United States Patent
Adam et al.

(10) Patent No.: US 12,739,464 B1
(45) Date of Patent: Sep. 15, 2026

(54) COMPUTER-IMPLEMENTED METHODS FOR PROVIDING GRAPHIC OVERLAYS ON LIVE VIDEOS USING A MACHINE LEARNING MODEL

(71) Applicant: Amazon Technologies, Inc., Seattle, WA (US)

(72) Inventors: Amit Adam, Haifa (IL); Avi Avraham Ben-Cohen, Holon (IL); Ran Schley, Kiryat Bialik (IL); Matan Karklinsky, Zur Hadassa (IL); Elizabeth Riley, Baltimore, MD (US); Marc Jason Stromberg, Frisco, TX (US); Alex Strand, Los Angeles, CA (US); Scott Patrick Swim, McCordsville, IN (US); Kevin Soldani, Norwalk, CT (US); Ianir Ideses, Raanana (IL)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 18/528,568

(22) Filed: Dec. 4, 2023

(51) Int. Cl.
*H04N 21/43* (2011.01)
*G06V 10/25* (2022.01)
(Continued)

(52) U.S. Cl.
CPC ......... *H04N 21/4316* (2013.01); *G06V 10/25* (2022.01); *H04N 21/2187* (2013.01)

(58) Field of Classification Search
None
See application file for complete search history.

(56) References Cited

U.S. PATENT DOCUMENTS 11,468,578 B2 10/2022 Nie et al.
11,568,617 B2 1/2023 Sung et al.
(Continued)

OTHER PUBLICATIONS

Non-Final Office Action, U.S. Appl. No. 18/542,192, Oct. 28, 2025, 21 pages.
(Continued)

*Primary Examiner* — Samira Monshi
(74) *Attorney, Agent, or Firm* — NICHOLSON DE VOS WEBSTER & ELLIOTT LLP

(57) ABSTRACT

Techniques for providing graphic overlays on live videos using a machine learning (ML) model are described. According to some examples, a computer-implemented method includes receiving, at an on-site production service, a live stream of an event; generating, by a machine learning model of the on-site production service, a first inference of a first set of surface-anchored coordinates for a plurality of points of a playing surface of the event in a first frame of the live stream, and a first set of visibility probabilities for the plurality of points; generating, by the machine learning model of the on-site production service, a second inference of a second set of surface-anchored coordinates for at least one of the plurality of points of the playing surface of the event in a second frame of the live stream, and a second visibility probability for the at least one of the plurality of points; and inserting, by the on-site production service, a graphic into the first frame and the second frame of the live stream based at least in part on the first inference of the first set of surface-anchored coordinates for the plurality of points of the playing surface of the event in the first frame, and the second inference of the second set of surface-anchored coordinates for the at least one of the plurality of points of the playing surface of the event in the second frame.

20 Claims, 17 Drawing Sheets

(51) Int. Cl.
*H04N 21/2187* (2011.01)
*H04N 21/431* (2011.01)

(56) References Cited

U.S. PATENT DOCUMENTS

| | | | |
|---|---|---|---|
| 2011/0150275 | A1 | 6/2011 | Tong et al. |
| 2019/0378287 | A1 | 12/2019 | Hollander et al. |
| 2020/0346114 | A1 * | 11/2020 | Verma ..................... A63F 13/53 |
| 2021/0383567 | A1 | 12/2021 | Akulshin et al. |
| 2023/0056531 | A1 | 2/2023 | Pedagadi et al. |

OTHER PUBLICATIONS

Notice of Allowance, U.S. App. No. 18/542,192, Apr. 30, 2026, 9 pages.
Requirement for Restriction/Election, U.S. App. No. 18/528,318, May 12, 2026, 7 pages.

* cited by examiner

600

1000

1100

COMPUTER-IMPLEMENTED METHODS FOR PROVIDING GRAPHIC OVERLAYS ON LIVE VIDEOS USING A MACHINE LEARNING MODEL

BACKGROUND

Service providers or content creators (such as businesses, artists, media distribution services, etc.) can employ one or more data centers to deliver content (such as web sites, web content, or other digital data) to users or clients. In certain examples, the content is video of a sporting event. It may be desirable to include a graphic overlay into the video. However, analyzing videos and adding a graphic overlay may be time-consuming and rely on complex human contributions (e.g., a human determining where to place the graphic overlay in each video frame) and/or a pre-event calibration process that determines the alignments between the playing field and the video frame as a function of camera pan, tilt, and zoom (PTZ) measurements, and thus are not practical in many scenarios.

BRIEF DESCRIPTION OF DRAWINGS

Various examples in accordance with the present disclosure will be described with reference to the following drawings.

DETAILED DESCRIPTION

Figure 1:
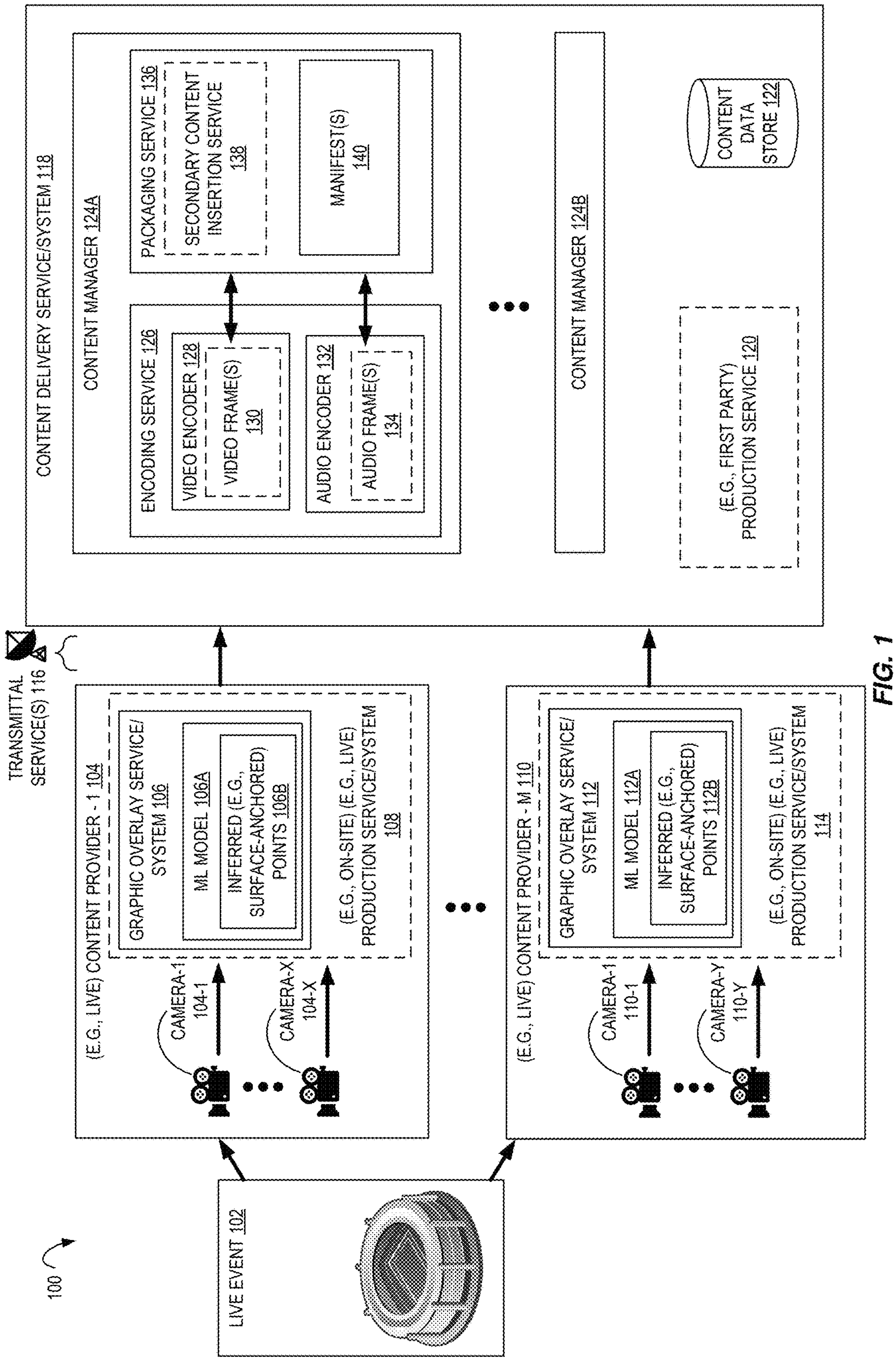
FIG. 1 is a diagram illustrating an environment including one or more content providers (e.g., on-site production service/system) that utilizes a machine learning model to add a graphic to a video of a live event, and sends the video with the graphic to a content delivery service/system according to some examples.

The present disclosure relates to methods, apparatus, systems, and non-transitory computer-readable storage media for providing graphic overlays on live videos using a machine learning (ML) model. Certain examples herein are directed to providing a graphic overlay on (e.g., live sports broadcast) videos using a calibration-free and low compute registration method and system. Certain examples herein are directed to a graphic overlay service/system (e.g., ML model thereof) that performs (e.g., real time) graphic insertion.

Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens; e.g., in the context of a system that processes data, these terms may mean processing data as it is received as opposed to storing or persisting the data once received for processing later on.

In certain broadcast industries (e.g., sporting events), producers regard and use graphic overlays on top of the live feed as one of their core tools for creating and running the (e.g., televised) show. While some of the graphics may be an overlaid logo at a fixed position on the screen (e.g., a broadcasting network's logo), other graphics are (e.g., virtually) anchored to the surface (e.g., playing field) of the event and/or to players. One example of a field-anchored graphic in American football broadcasts is an information-graphic which appears to be static on the ground (e.g., as the camera moves), e.g., a graphic stating which down it is and how many yards are left to go.

In certain examples, a technology used for producing such graphics is registration, or finding the transformation, from locations on the playing field (e.g., specified in yards) to pixels on the current frame shown in the video. One way to perform such registration is the use of specialized hardware continuously measuring the pan and tilt angles of the camera(s) and their focal length, and lengthy and operational-heavy pre-event calibration processes determining the alignments between the playing field and the image as a function of these camera pan, tilt, and zoom (PTZ) measurements.

Beyond the costly calibration process and operational overhead, certain practices are constrained to be applicable only to cameras with a fixed location, e.g., where these cameras can pan, tilt, and zoom in and out, but cannot move outside of a fixed position. This greatly limits the producers of the show in their story-telling abilities. For example, certain broadcasts (e.g., of American football) use video from a movable camera (e.g., Skycam brand camera) that runs on cables above the playing field, but it is not possible to add a graphic overlay onto such video using certain examples of graphic overlay services, e.g., because there is no known mapping (e.g., homography) of the frame(s) of that video (e.g., the pixels therein) to the playing field.

To overcome these issues, certain examples herein are directed to a graphic overlay service/system that utilizes an ML model that allows adding such surface-anchored (e.g., ground-anchored) graphics, for example, using a registration method and/or process that relies solely on video inputs (e.g., without any PTZ data from specialized hardware). In certain examples, the graphic overlay ML model generates (i) a first inference of a first set of surface-anchored coordinates for a plurality of points of a playing surface of an event in a first frame of a live stream, and a first set of visibility probabilities for the plurality of points and (ii) a second inference of a second set of surface-anchored coordinates for at least one of the plurality of points of the playing surface of the event in a second frame of the live stream, and a second visibility probability for the at least one of the plurality of points. In certain examples, a graphic (e.g., in game statistics) is inserted into the first frame and the second frame of the live stream based at least in part on the first inference of the first set of surface-anchored coordinates for the plurality of points of the playing surface of the event in the first frame, and the second inference of the second set of surface-anchored coordinates for the at least one of the plurality of points of the playing surface of the event in the second frame.

Certain examples herein are directed to a graphic overlay service/system (e.g., ML model thereof) that does not require a pre-event calibration process. Certain examples herein are directed to a graphic overlay service/system (e.g., ML model thereof) that is suitable for any camera including (e.g., three-dimensional) moving cameras. In certain examples, a camera (e.g., a movable camera) is mounted to an aircraft (e.g., drone), land-based vehicle, water-based vehicle, platform, etc.

In certain examples, a "live feed" is connected to an athlete or person using the system. In certain examples, a drone is following the athlete while skiing, and the graphic overlay ML model is running on drone or virtual reality (VR) and/or augmented reality (AR) system (e.g., goggles) worn by a skier. In certain examples, the information presented on the "surface anchored" coordinates indicates certain objects, e.g., snowpack, buried hazards (e.g., crevasses), information regarding other athletes, etc. In certain examples, the drone (or equipment on skier) has additional sensors (e.g., radar) to identify obstacles, e.g., as a personal artificial intelligence (AI) assistant to help improve performance, which has the ability to present information on at surface anchored positions, in unobtrusive ways.

In certain examples, the graphic overlay is performed on-site, e.g., in a constrained environment of a production truck. One issue is that certain production trucks have a limited space and power consumption, e.g., and thus have a limited compute resources (e.g., compute power) and/or memory resources (e.g., as compared to the compute power and/or memory of an off-site cloud computing service/system). To overcome these issues, certain examples herein are directed to a graphic overlay service/system that utilizes an ML model that is implemented using minimal compute resources and/or minimal memory resources (e.g., the compute and memory resources of a production truck) for example, while still running at full resolution (e.g., without skipping any frames of the video) and in real time.

Certain examples herein are directed to a graphic overlay service/system (e.g., ML model thereof) that uses the information present across all of the image (e.g., video frame), to directly reason about the visibility of a pre-specified set of field points. Certain examples herein do not rely on additional measurements such as camera location and/or viewing direction, and/or on measuring a camera's current focal length. Moreover, for those field points which are indeed visible in the current image, certain examples herein directly identify the locations of these points in the image. In contrast with certain examples of computer vision, certain examples herein are directed to a graphic overlay service/system (e.g., ML model thereof) that uses identified points (e.g., pixel(s)) that do not have to be specialized feature points or corners and/or do not have to have an abundance of local visual information around them. In certain examples, this significantly simplifies the design of the graphic overlay service/system (e.g., ML model thereof) and allows the approach to be highly compute-efficient, e.g., providing significant practical value in production-truck environments. Moreover, by directly identifying locations of multiple (e.g., evenly dispersed) surface (e.g., field) points, certain examples of a graphic overlay service/system (e.g., ML model thereof) are able to handle any general transformation between the field and the image, e.g., allowing the graphic overlay service/system (e.g., ML model thereof) to handle images (e.g., video frames) with lens distortions, and is in contrast with other practices which assume a limited form of transformation between the field and the image.

Certain examples herein are directed to a graphic overlay service/system (e.g., ML model thereof) that is based on a pre-trained model for which varying illumination conditions and geometries were taken into account, e.g., and thus does not require costly pre-game on-venue calibration. This allows those examples of a graphic overlay service/system (e.g., ML model thereof) to be easily deployed across venues.

Certain examples herein are directed to a graphic overlay service/system (e.g., ML model thereof) that can run on video streams from events that are produced by other parties, e.g., because the graphic overlay service/system (e.g., ML model thereof) does not require tuning and/or calibration of the system on-site before the actual event.

Certain examples herein are directed to a graphic overlay service/system (e.g., ML model thereof) that is not limited for use with (e.g., only) key points (e.g., field markings, intersections of field markings, etc.). e.g., any point on a playing surface may be utilized. Certain examples herein are directed to a graphic overlay service/system (e.g., ML model thereof) that is not limited for use with (e.g., only) dense features (e.g., line markings and/or distinctive regions on a playing field), e.g., a particular feature of a playing surface need not be utilized. Dense features may include line markings such as (1) the hash marks that mark off one-yard increments, (2) the inbound lines that mark the boundary of the playing field, and (3) yard lines that mark off five-yard increments. Dense features may include distinctive regions such as (i) numerals that display the distance from the closest goal line in multiples of ten, (ii) arrows adjacent to the numerals to indicate direction to the closest goal line, and (iii) logos of the team, sponsor, league, or other entity. Other sports may have different line markings and/or distinctive regions. A soccer pitch, for example, typically includes only a small number of line markings such as the goalie boxes, penalty boxes, penalty arcs, center circle, and corner arcs. Certain examples herein are directed to a graphic overlay service/system (e.g., ML model thereof) that does not use and/or generate a heatmap for key points and/or dense features. Certain examples herein are directed to a graphic overlay service/system (e.g., ML model thereof) that does not use homography, e.g., the ML model does not output an estimation of homography (e.g., homographic transformation parameters and/or a homographic matrix) for an image frame, e.g., between an image plane and a ground plane. Certain examples herein are directed to a graphic overlay service/system (e.g., ML model thereof) that performs an inference for a three-dimensional surface, e.g., is not limited to a two-dimensional planar surface. In certain examples, a three-dimensional surface is not flat, e.g., the three-dimensional surface has one or more surface contours that vary in a dimension (e.g., Z) with respect to other dimensions (e.g., X and Y).

Turning now to the figures, FIG. 1 is a diagram illustrating an environment 100 including one or more content providers 104 (e.g., and corresponding on-site production service/system) that utilizes a machine learning model to add a graphic to a video of a live event, and sends the video with the graphic to a content delivery service/system 118 according to some examples.

Although multiple content providers and camera are shown, it should be understood that a single content provider and single camera may be utilized. FIG. 1 includes a first content provider 104 and a second content provider 110 to capture a live event 102 on a respective set of one or more cameras (e.g., one or more of cameras 104-1 to 104-X, where X is any positive integer greater than one, and one or more of cameras 110-1 to 110-Y, where Y is any positive integer greater than one) (e.g., and microphones) and transmit the video (e.g., live stream) (e.g., along with the corresponding audio) to a content delivery service/system 118 having an encoding service 126 according to some examples.

In certain examples, the live event 102 is a game of a sporting match, such as, but not limited to, each individual event (e.g., game) of baseball, softball, football, soccer, basketball, hockey, skiing, climbing, etc. In certain examples, one or more (e.g., live) content providers (e.g., video production truck(s)) are on site to capture video (e.g., and audio) of the live event 102.

Figure 5:
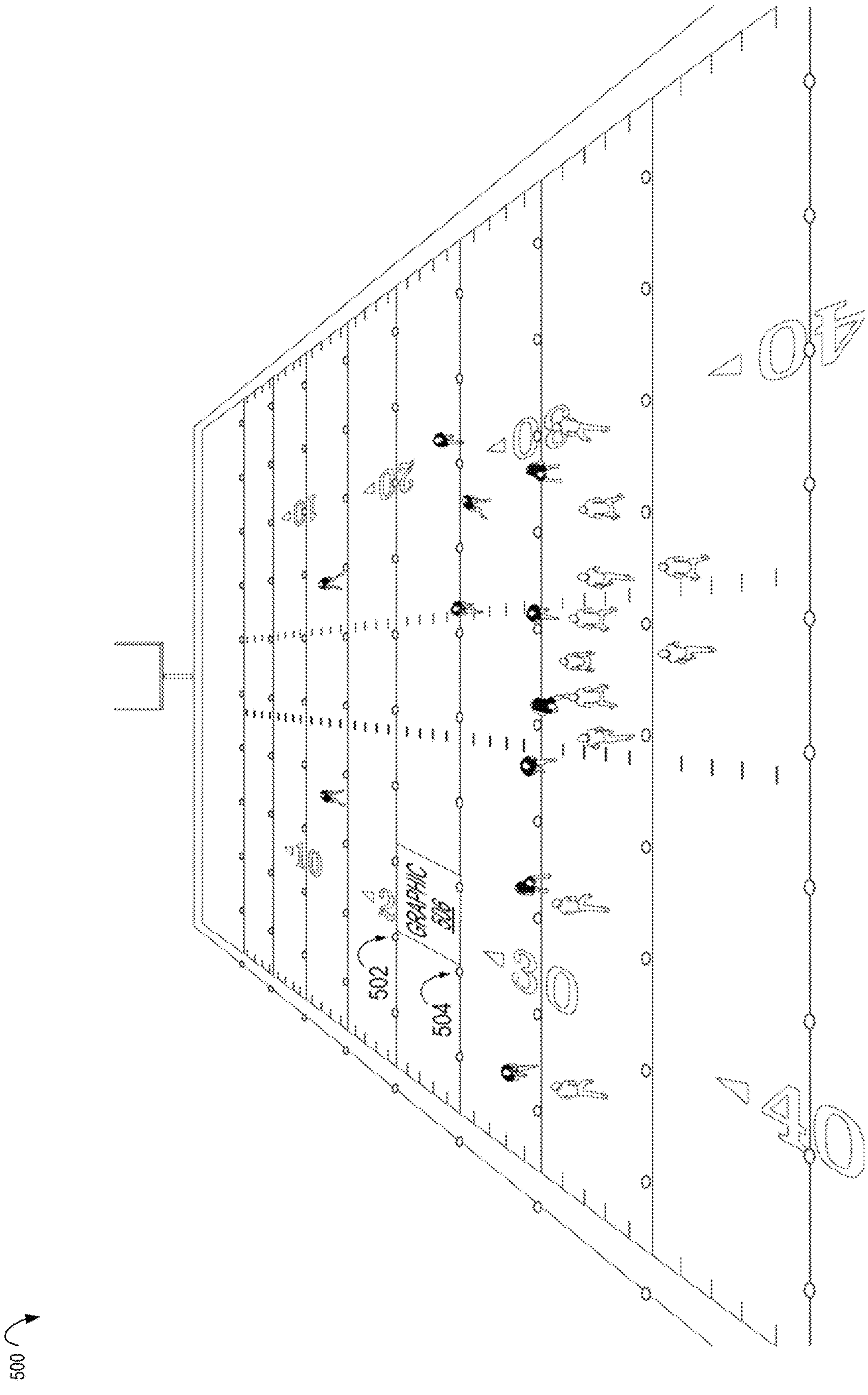
FIG. 5 is a diagram illustrating a first video frame of a shot from a movable camera in a first location with a plurality of points, generated by a machine learning model, overlaid on a two-dimensional playing surface of a football game according to some examples.
Figure 6:
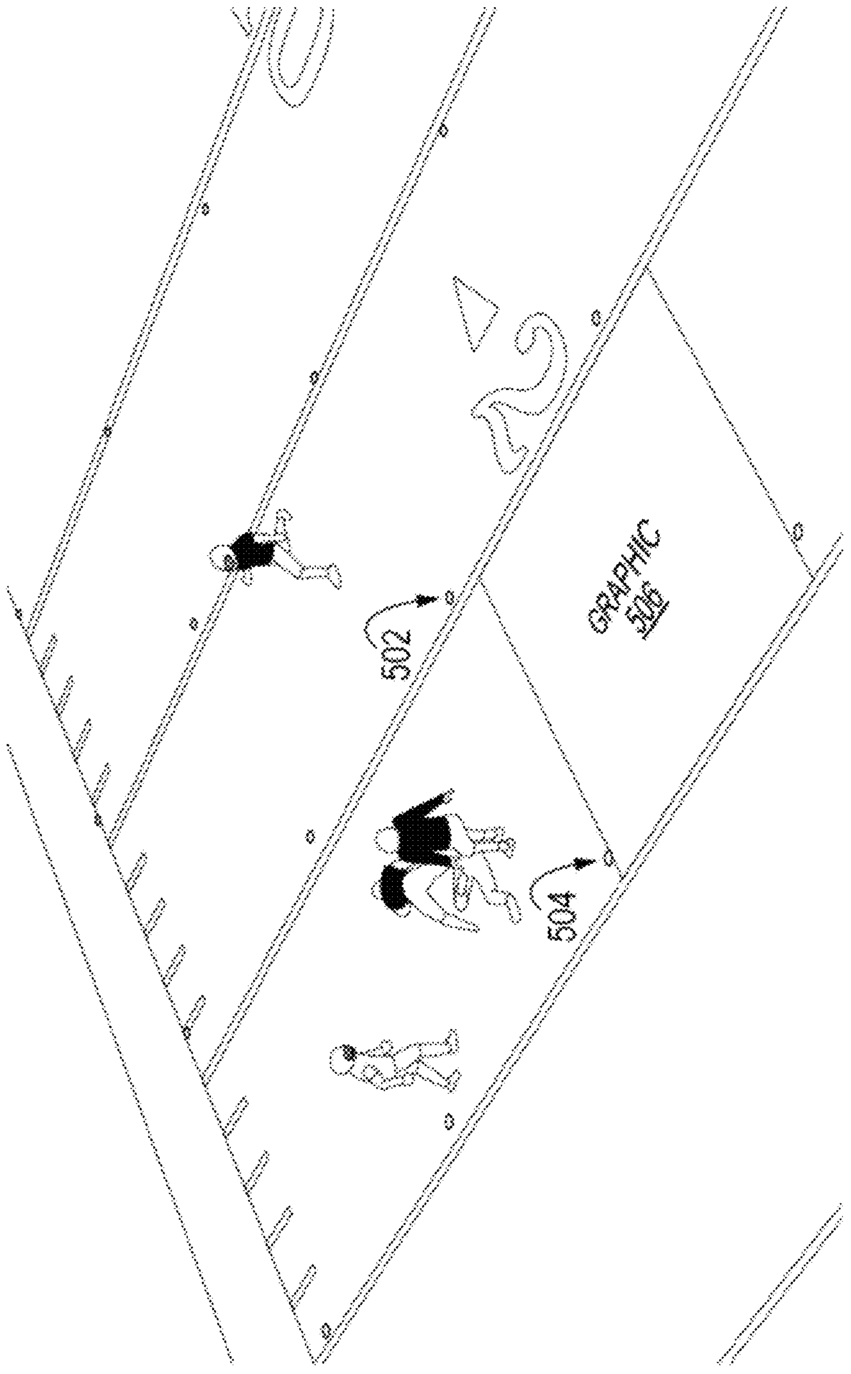
FIG. 6 is a diagram illustrating a second video frame of the shot from the movable camera from FIG. 5 in a second different location with a proper subset of the points, generated by the machine learning model, overlaid on the two-dimensional playing surface of the football game according to some examples.

In certain examples, a (e.g., single) content provider 104 is on site to capture video (e.g., and audio) of the live event 102. In certain examples, content provider 104 includes (e.g., or has access to the video output of) one or more of cameras 104-1 to 104-X. In certain examples, content provider 104 includes a graphic overlay service/system 106, for example, to overlay a graphic (e.g., image) onto one or more frames of a video of an event (e.g., live event 102), e.g., to generate a video with an inserted graphic. In certain examples, a graphic includes a (e.g., visual) representation of statistics and/or metrics relevant to the event, e.g., for a particular participant in the event. In certain examples, the graphic may include player participation report, performance metrics, and/or statistics. In certain examples, statistics (e.g., for American football) include the distance traveled, formations (e.g., offense and defense), completion probability, maximum speed of a player, coverage, expected rushing yards, time on field, route detection, and/or win probability. In certain examples, the graphic is a two-dimensional image, e.g., as shown in FIGS. 5-6. In certain examples, a graphic is an advertisement, e.g., related to the content being shown.

In certain examples, the graphic overlay service/system 106 includes an ML model 106A to enable overlay of a graphic on a video. In certain examples, the (e.g., graphic overlay) ML model 106A generates a first inference of a first set of (e.g., surface-anchored) coordinates for a plurality of inferred points 106B of a (e.g., playing) surface of the (e.g., live) event 102 in a first frame of a video (e.g., live stream), and a first set of visibility probabilities for the plurality of points (e.g., the probability (e.g., weighted between 0 and 1) that a point is visible in a particular frame where the moving camera may cause one or more points to not be visible). In certain examples, the (e.g., graphic overlay) ML model 106A generates a second inference of a second set of (e.g., surface-anchored) coordinates for at least one of the plurality of inferred points 106B of the (e.g., playing surface) of the (e.g., live) event 102 in a second frame of the video (e.g., live stream), and a second visibility probability for the at least one of the plurality of points. In certain examples, the graphic overlay service/system 106 inserts a graphic (e.g., statistics for the event) into the first frame and the second frame of the video (e.g., live) stream based at least in part on the first inference of the first set of (e.g., surface-anchored) coordinates for the plurality of points of the playing surface of the event in the first frame, and the second inference of the second set of (e.g., surface-anchored) coordinates for the at least one of the plurality of points of the playing surface of the event in the second frame. In certain examples, the graphic overlay service/system 106 inserts a graphic into each frame of multiple frames in different orientations (e.g., skew) and/or scale for each frame so that the graphic appears to be physically attached to a certain surface in the video, e.g., as shown in FIGS. 5-6.

In certain examples, the ML model 106A takes a (e.g., single) frame as an input, and outputs a set of surface-anchored coordinates (e.g., in yards for American football, in feet for baseball, etc.) for a plurality of inferred points 106B of a (e.g., playing) surface of the (e.g., live) event 102 in the frame, and a visibility probability for each point of the plurality of points. In certain examples, the visibility probability is a value that represents the probability (e.g., weighted between 0 and 1) that a particular point is visible in a particular frame.

In certain examples, the ML model 106A (or 112A) includes two classes: a first class to indicate a particular point is visible in the frame and a second class to indicate a particular point is not visible in the frame. In certain examples, the ML model 106A (or 112A) uses the inferred (i) visible or (ii) not visible classification as a classification head (e.g., the classification generated by a classification layer). In certain examples, the ML model 106A (or 112A) uses the inferred surface-anchored (e.g., ground-anchored) coordinates as a regression head (e.g., the coordinates generated by a regression layer). In certain examples, the surface-anchored (e.g., ground-anchored) coordinates and the classification (e.g., (i) visible or (ii) not visible) are used together to train the ML model 106A.

In certain examples, the ML model 106A takes a (e.g., single) frame as an input, and converts that image to a set of features for each point. In certain examples, an American football field (e.g., 120 yards in length and 53.3 yards in width) is to have 231 points (e.g., 21 along the length×11 along the width evenly distributed grid points).

In certain examples, the ML model 106A takes a (e.g., single) frame as an input, and converts that image to a first number of elements (e.g., 512 elements) feature vector for each point. In certain examples, the frame is converted to red, green, blue (RGB) format, e.g., before the feature vectors are generated. In certain examples, the ML model 106A performs a linear transformation of the (e.g., 512 elements) feature vector for each point to a smaller (e.g., element-wise) feature vector, e.g., a 128-element vector for each point. In certain examples, a non-linear operation (e.g., a regression) is performed on the smaller feature vector, e.g., where if an element is negative, it is overwritten with a zero.

In certain examples, the ML model 106A is a residual network (ResNet), for example, an 18-layer ResNet (ResNet18) model. In certain examples, the ML model 106A has a size of less than about 50 megabytes of storage, e.g., to allow for deployment using the memory resources in a computer system (e.g., graphics processing unit (GPU)) of a production truck.

In certain examples, the ML model 106A takes each feature vector for a point of the plurality of points (e.g., 231 points), and generates (e.g., in real time) an inference of surface-anchored (e.g., ground-anchored) coordinates for each point (e.g., and a corresponding visual probability for each point). In certain examples, the visual probabilities are normalized to be between zero and one, e.g., by a normalized exponent (e.g., Softmax) function. In certain examples, the ML model 106A outputs an index to identify each point, e.g., an index of 0 to 230 for 231 points.

In a two-dimensional (e.g., American football field) example (e.g., in FIGS. 5-7), this would be the width coordinate (e.g., X-coordinate) for the point on surface in the frame and the length coordinate (e.g., Y-coordinate) for the point on the surface in the frame, such that for 231 points, there are 462 surface-anchored coordinates that are inferred (e.g., (X,Y) for each point), for example, and 231 corresponding class predictions (e.g., one prediction for each set of (X, Y) coordinates). It should be understood that this is extendable for three-dimensions (e.g., in FIGS. 8-11), for example, adding a height coordinate (e.g., Z-coordinate) for each point on the surface of the frame, e.g., using the American football field example, in certain examples there are 693 surface-anchored coordinates that are inferred (e.g., (X, Y, Z) for each point), e.g., and 231 corresponding class predictions (e.g., one prediction for each set of (X, Y, Z) coordinates). In certain examples, a surface-anchored coordinate is anchored to (e.g., refers to) a physical point of a surface depicted in a video (e.g., frame), for example, in contrast to image coordinates (e.g., pixel coordinates).

In certain examples, the surface-anchored coordinates (e.g., and visual probability) are inferred for each frame of a plurality of input frames, e.g., each from a movable camera. In certain examples, a first frame from a first location of a movable camera shows a part of a surface (e.g., playing surface) and a second frame from a different (e.g., different laterally) second location of the movable camera shows a proper subset of the part of the surface, and the ML model 106A allows for a generation of surface-anchored coordinates for points visible in the first frame and a proper subset of those points visible in the second frame.

In certain examples, the (e.g., real time generated) surface-anchored coordinates are used by a graphic overlay service/system to insert (e.g., in real time) one or more graphics. Certain examples herein use the term "surface-anchored points" to mean physical points at fixed physical positions on a physical surface, e.g., on a ski run, a climbing wall, or a playing field. In certain examples, the term "anchored" is used to emphasize that a same physical point is identifiable as a video progresses (e.g., frame by frame) and a corresponding camera moves. In certain examples, the image locations (e.g., pixels) of these surface-anchored physical points will change from one video frame to the next where the camera is moving with respect to the surface. In certain examples, these image points (e.g., the images of the surface-anchored physical points) are referred to as surface-anchored points, although from the context it should be clear when this means "the moving image locations of fixed/anchored physical points of the surface". In certain examples, these image points are used to overlay graphics on the video, e.g., in order to make it seem as if the graphics are actually affixed (e.g., painted), and hence "anchored", on the physical surface. For example, in FIG. 7, the surface-anchored points are points on the playing field every 5 yards, e.g., starting at the top row the points are on the 10th yard line (10,0), (10,5), and so on, with their image locations denoted at the bottom-left corner of each text box. In certain examples, as the video progresses, the image (e.g., pixel) locations for those points will move but are still denoting the same surface-anchored points (e.g., (10,0), (10,5) and so on) which are characterized by specific physical locations on the yard-lines.

In certain examples, the graphic overlay service/system 106 (e.g., ML model 106A thereof) is implemented in an (e.g., on-site) (e.g., live) production service/system 108, e.g., implemented by the computing resources of a production truck. In certain examples, content provider 104 includes a (e.g., on-site) (e.g., live) production service 108, e.g., to allow multi-camera video production such that the video from two or more cameras and or the audio from two or more audio sources are combined into a single output as a dynamic mix (e.g., by a director). In certain examples, content provider 104 is to encode the resulting output (e.g. and provide a graphic overlay in the output) and send that encoded content to one or more downstream entities (e.g., content delivery service/system 118 and/or user(s)), for example, via (e.g., wired and/or wireless) transmittal services 116, e.g., via one or more networks.

In certain examples, the graphic overlay service/system 106 generates an inference for each frame of a video, e.g., where a graphic is to be overlayed (e.g., an inference generated at least as fast as a desired frame rate of the video, e.g., at least 60 frames per second). In certain examples, the graphic overlay service/system 106 generates an inference for a graphic overlay service/system 106 of a video, e.g., and the graphic overlay service/system 106 interpolates the point(s) for the frames in between. In certain examples, in reference to point 502 and point 504 in FIGS. 5-6, the graphic overlay service/system 106 interpolates a point (e.g., a non-inferred point) between point 502 and point 504, e.g., a point between the $25^{th}$ and $20^{th}$ yard lines.

Figure 7:
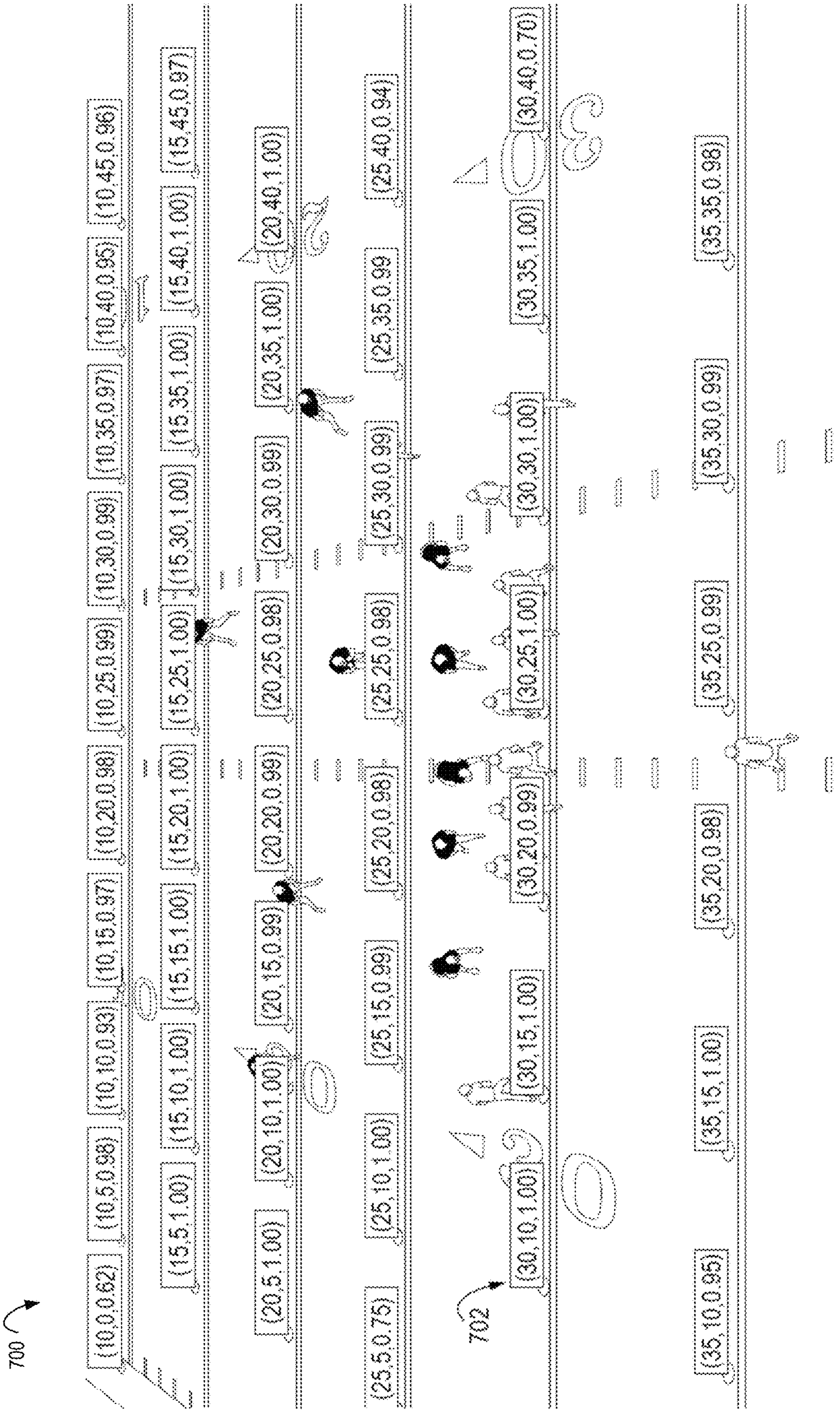
FIG. 7 is a diagram illustrating a video frame with a plurality of points, generated by a machine learning model, overlaid on a playing surface of a football game with an inference from the machine learning model for each point of a vertical (e.g., from an end zone) surface-anchored coordinate, a lateral (e.g., from a sideline) surface-anchored coordinate, and a visibility probability according to some examples.

In certain examples, the inferences are themselves overlaid onto a frame, e.g., as shown in FIG. 7 with the surface-anchored (X, Y) coordinates (in yards) for the plurality of inferred points of the playing surface of the (e.g., live) event in the frame, and a visibility probability for each point of the plurality of points.

In certain examples, one or more additional (e.g., M−1, where M is any positive integer greater than 1) content providers (e.g., content provider 110) are also on site to capture video (e.g., and audio) of the live event 102 and provide graphic overlay, e.g., via inferred (e.g., surface-anchored) points 112B from graphic overlay service/system 112 (e.g., ML model 112A thereof). In certain examples, graphic overlay service/system 112 (e.g., ML model 112A thereof) is an instance of graphic overlay service/system 106 (e.g., ML model 106A thereof). In certain examples, content provider 110 includes (e.g., or has access to the video output of) one or more of cameras 110-1 to 110-Y. In certain examples, content provider 110 includes a (e.g., on-site) (e.g., live) production service 114 (e.g., implemented by the computing resources of a production truck), e.g., to allow multi-camera video production such that the video from two or more cameras and or the audio from two or more audio sources are combined into a single output as a dynamic mix (e.g., by a director). In certain examples, content provider 110 is to encode the resulting output (e.g. and provide a graphic overlay in the output) and send that encoded content to one or more downstream entities (e.g., content delivery service/system 118 and/or user(s)), for example, via (e.g., wired and/or wireless) transmittal services 116, e.g., via one or more networks.

In certain examples when content providers are different (e.g., different entities, such (e.g., different live streamers or "television" networks), they may use different graphic overlays and/or different transmittal services 116.

In certain examples, the content (e.g., with graphic overlay) from content provider(s) 104, 110, etc. is sent to one or more content delivery services/systems (e.g., content delivery service/system 118).

The depicted content delivery service/system 118 includes a content data store 122, which may be implemented in one or more data centers. As one example, a media file (e.g., including a video file and audio file) (e.g., a media container) that is to be encoded is accessed from the content data store 122 by one or more content managers 124A-124B. In certain examples, the media file may be uploaded to content data store 122 by content provider(s) or provided directly (e.g., as live content) to one or more content managers 124A-124B by content provider(s) (e.g., from a live content encoder).

In certain examples, the content manager (e.g., described in reference to content manager 124A, but one or more other content managers may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 126 is to encode the media file (e.g., video file and corresponding audio file) into one or more sets of video and audio representations (e.g., streams). In FIG. 1, video encoder 128 is to receive an input of a video file and create video frame(s) 130 from that video file, e.g., for a video frame and/or fragment duration. In FIG. 1, audio encoder 132 is to receive an input of an audio file and create audio frame(s) 134 (e.g., a number of audio samples within each frame) for that audio file, e.g., at an audio frame and/or fragment duration. In certain examples, packaging service 136 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 126 may include a plurality of instances of video encoder 128 and audio encoder 132, e.g., to process multiple inputs in parallel. In certain examples, secondary content insertion service 138 adds secondary content (e.g., advertisement(s)) into a main content. In certain examples, encoding service 126 is to encode both the main content and secondary content, e.g., and the secondary content insertion service 138 is to insert the secondary content into the main content.

Figure 2:
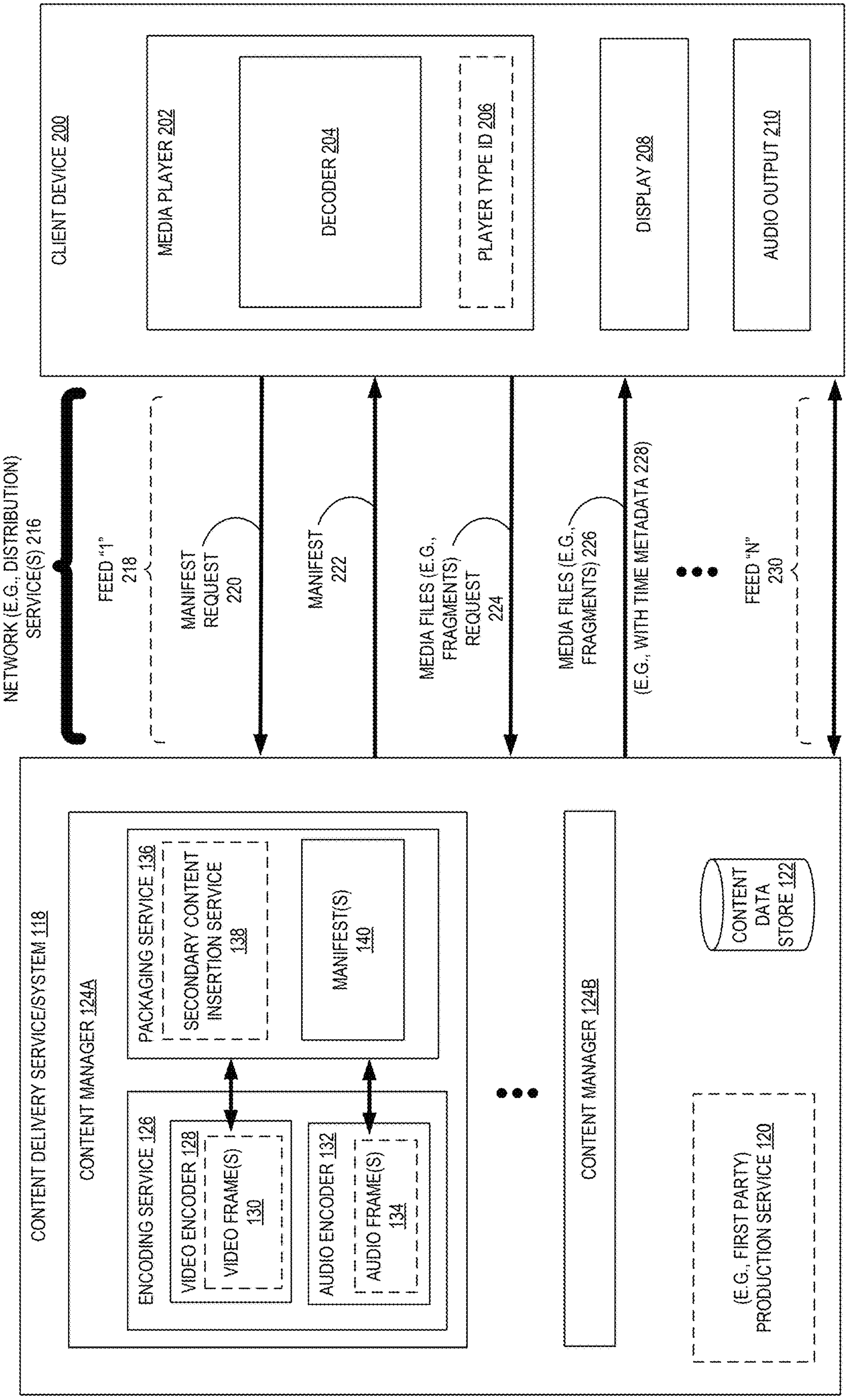
FIG. 2 is a diagram illustrating a content delivery service/system to send videos (e.g., live streams) to a client device according to some examples.

FIG. 2 is a diagram illustrating a content delivery service/system 118 to send videos (e.g., live streams) to a client device 200 according to some examples. In certain examples, client device 200 includes a media player 202 to play one or more feeds (e.g., live streams), for example, sent via network (e.g., distribution) services 216. In certain examples, media player 202 includes a decoder 204 to decode a feed for viewing on display 208, e.g., displaying the video with a graphic overlaid.

In certain examples, content delivery service/system 118 includes a (e.g., first party) production service 120, e.g., to allow multi-provider video production such that the video from two or more providers and or the audio from two or more audio providers are combined into a single output as a dynamic mix (e.g., by a director). In certain examples, content delivery service/system 118 is to encode the resulting output and send that encoded content to one or more downstream entities (e.g., one or more instances of client device 200), for example, via (e.g., wired and/or wireless) network services 216.

In certain examples, packaging service 136 includes one or more manifests 140, e.g., identifying the media file(s) (e.g., fragments, streams, etc.) to be output from content manager. In certain examples, a manifest for a particular media file (e.g., a particular title) identifies a proper subset of video and audio representations of the media file for a particular client device 200 (e.g., based on the client's media player 202 (e.g., determined from its type ID value 206), display 208 resolution, audio output 210 capabilities, and/or available bandwidth). In certain examples, the content is sourced from the content delivery service/system 118 in two parts: (i) the manifest 140 of all available media representations (e.g., their URL addresses and, optionally, other characteristics) and (ii) the media files (e.g., representations) (e.g., stream of fragments) in a single (e.g., container) or multiple files.

In certain examples, a client device 200 is to read (or store) a manifest 140 (e.g., sent in response to manifest request 220) before the client device may make a request for the media from that manifest, and thus access media files (e.g., audio fragments and corresponding video fragments) from media file content delivery service/system 118 (e.g., content data store 122), e.g., the URL for a live feed. In certain examples, to play feed 1 218, a client device 200 is to read manifest 222 (e.g., sent in response to manifest request 220) before the client device may make a request 224 for the media indicated by that manifest, and thus access media files 226 (e.g., audio fragments and corresponding video fragments, e.g., and time metadata 228) from media file content delivery service/system 118 (e.g., content data store 122), e.g., the URL for live feed 1 (e.g., with graphic overlay).

Figure 3:
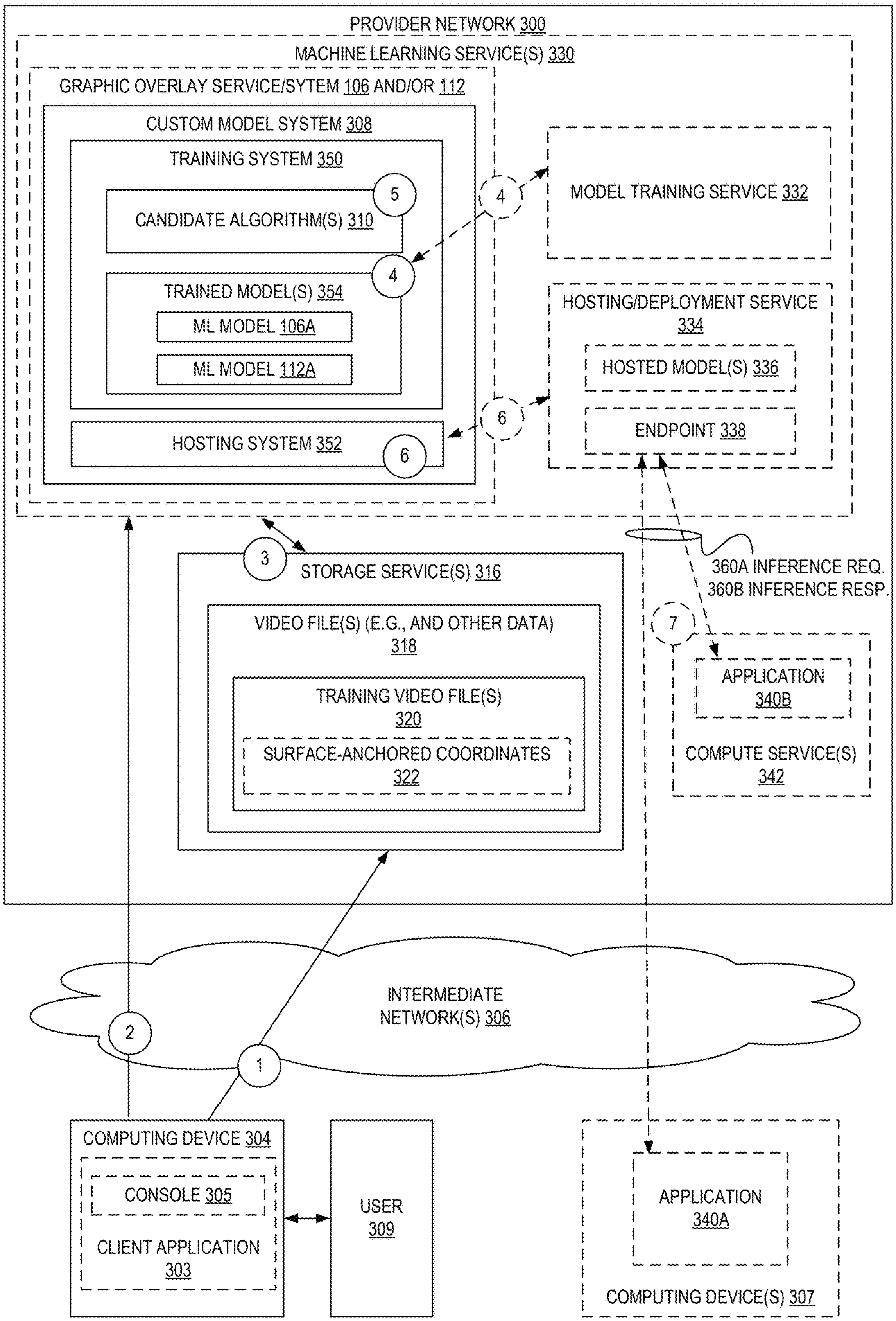
FIG. 3 is a diagram illustrating an environment for creating, training, and using a machine learning model according to some examples.

In certain examples, a client device 200 is to switch between feeds, e.g., switch from a first feed 218 being currently displayed on display 212 to a second feed (e.g., feed "N" 230, where N is any positive integer greater than one), e.g., via a request from a user as discussed further in reference to FIG. 3. In certain examples, to play feed 2 230, a client device 200 is to read manifest (e.g., sent in response to manifest request) before the client device may make a request for the media indicated by that manifest, and thus access media files (e.g., audio fragments and corresponding video fragments, e.g., and time metadata) from media file content delivery service/system 118 (e.g., content data store 122), e.g., the URL for live feed 2 (e.g., with graphic overlay).

FIG. 3 is a diagram illustrating an environment for creating, training, and using a machine learning model according to some examples. FIG. 3 includes a graphic overlay service 106 and/or 112, one or more storage services 316, one or more machine learning services 330, one or more model training services 332, one or more hosting/deployment services 334, one or more video intake services 144, and one or more compute services 342 implemented within a multi-tenant provider network 300. Each of the graphic overlay service 106 and/or 112, one or more storage services 316, one or more machine learning services 330, one or more model training services 332, one or more hosting/deployment services 334, one or more video intake services 144, and one or more compute services 342 may be implemented via software, hardware, or a combination of both, and may be implemented in a distributed manner using multiple different computing devices.

A provider network 300 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 342), a storage service 316 that can store data objects (such as video files 318), etc. The users (or "customers") of provider networks 300 may utilize one or more user accounts that are associated with a customer account, though these terms may be used somewhat interchangeably depending upon the context of use. Users may interact with a provider network 300 across one or more intermediate networks 306 (e.g., the internet) via one or more interface(s), such as through use of application programming interface (API) calls, via a console 305 implemented as a website or application, etc. The interface(s) may be part of, or serve as a front-end to, a control plane of the provider network 300 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 300 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 300 by an on-demand code execution service (which may be one of compute service(s) 342) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 340B) that can be executed on demand, without requiring the user to maintain dedicated infrastructure to execute the serverless function. Instead, the serverless functions can be executed on demand using resources maintained by the provider network 300. In some examples, these resources may be maintained in a "ready" state (e.g., having a pre-initialized runtime environment configured to execute the serverless functions), allowing the serverless functions to be executed in near real time.

The graphic overlay service 106 and/or 112, in some examples, is a machine learning powered service that makes it easy for users to build and use trained model(s) 354, e.g., to build and use a trained model 354 that infers surface-anchored (e.g., ground-anchored) coordinates and the classification (e.g., (i) visible or (ii) not visible) for a frame of a video.

The custom model system 308, for example, may enable users to generate trained models 354 from candidate algorithms 310, e.g., including one or more residual (e.g., neural) network algorithms. Examples herein allow a customer to create trained models 354 (e.g., ML models 106A and/or 122A) by supplying data, e.g., training video files 320 (e.g., with surface-anchored coordinates 322 of points in a frame(s)). Data 318 may include (e.g., labeled) training data and/or evaluation data.

At a high level, machine learning may include two major components that are required to be put in place in order to expose advertised functionality to the customer: (i) training (e.g., by training system 350) and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a plurality of candidate models 310 and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 309 may provide or otherwise identify data 318 (e.g., training video files 320 and/or surface-anchored coordinates 322 of points in a frame(s)) for use in creating a custom model. For example, as shown at circle (1), the user 309 may utilize a client application 303 executed by a computing device 304 (e.g., a web-application implementing a console 305 for the provider network 300, a standalone application, another web-application of another entity that utilizes the graphic overlay service 106 and/or 112 as a part of its backend, a database or mixed-SQL environment, etc.) to cause the computing device 304 to upload the video file(s) 318 to a storage location (e.g., provided by a storage service 316 such as an object storage service of a provider network 300).

The data 318 may be a video file and a columnar dataset that includes rows (or entries) of data values (e.g., surface-anchored coordinates 322 of points in a frame(s) and/or visibility classifications), where the data values may be arranged according to one or more columns (or attributes) and may be of a same datatype (e.g., one storing text). In some cases, the data 318 includes headings or other metadata describing names or datatypes of the columns, though in some cases this metadata may not exist. For example, some or all of the data 318 may have been provided by a user as a plaintext file (e.g., a comma-separated values (CSV) or tab-separated values (TSV) file), an exported database table or structure, an application-specific file such as a spreadsheet, etc.

For example, when a user 309 desires to train a candidate algorithm 310 (e.g., candidate ResNet algorithm), this file (or files) may be a CSV with at least two values per row—e.g., one column for each coordinate (e.g., (X, Y) or (X, Y, Z) coordinates), one column for the visibility probability, and/or another column storing a frame ID that indicates the corresponding frame(s), e.g., "coordinates, class, frame".

Thereafter, at circle (2) the computing device 304 may issue one or more requests (e.g., API calls) to the machine learning service 330 that indicate the user's 309 desire to train one or more candidate algorithms 310 into one or more trained models 354. The request may be of a type that identifies which type of model(s) are to be created or identifies that the machine learning service 330 itself is to identify the candidate algorithms(s) 310. The request may also include one or more of an identifier of a storage location or locations storing the data 318 (e.g., an identifier of the training video files 320 and/or surface-anchored coordinates 322 of points in a frame(s)), which may identify a storage location (e.g., via a Uniform Resource Locator (URL), a bucket/folder identifier, etc.) within the provider network 300 (e.g., as offered by a storage service 316) or external to the provider network 300, a format identifier of the data 318, a language identifier of the language of the data 318, etc. In some examples, the request includes an identifier (e.g., from the user 309) of the candidate algorithms(s) 310 themselves within the request.

Responsive to receipt of the request, the custom model system 308 of the machine learning service 330 is invoked and begins operations for training the corresponding type of model. For example, the custom model system 308 may identify what type of model is to be trained (e.g., via analyzing the method call associated with the request), the storage location(s) associated with the data 318 (e.g., training video files 320 and/or surface-anchored coordinates 322 of points in a frame(s)), etc. Thus, the custom model system 308 may retrieve any stored data 318 (e.g., videos) as shown at circle (3), which may be from a storage location within the provider network 300 or external to the provider network 300.

In some examples, the training (at circle (4)) of the candidate algorithms 310 includes performing (at optional, dotted circle (4)) candidate algorithms 310 by training service 332 of machine learning service 330 described herein a particular training job (e.g., hyperparameter optimization tuning job), or the like. In some examples, the machine learning services 330 includes (at optional, dotted circle (5)) selecting of a proper subset of candidate models from a plurality of candidate algorithms 310 for training by training service 332. In some examples, the hosting system 352 (at circle (6)) of the custom model system 308 may make use (at optional, dotted circle (6)) of a hosting/deployment service 334 of a machine learning service 330 to deploy a model (e.g., to a production truck) as a hosted model 336 (e.g., ML model 106A and/or ML model 112A in FIG. 1) in association with an endpoint 338 that can receive inference requests from client applications 340A and/or 340B at circle (7), provide the inference requests 360A to the associated hosted model(s) 336, and provide inference results 360B (e.g., a prediction, including, but not limited to, predicted classes, predicted entities, predicted events, etc.) back to applications 340A and/or 340B, which may be executed by one or more computing devices 307 outside of the provider network 300 or by one or more computing devices of a compute service 342 (e.g., hardware virtualization service, serverless code execution service, etc.) within the provider network 300. Inference results 360B may be displayed to a user (e.g., in a graphical user interface of the application) and/or exported as a data structure (e.g., in a selected format). The trained model 354 may then be used, e.g., within graphic overlay service (or system) 106 and/or 112.

Figure 4:
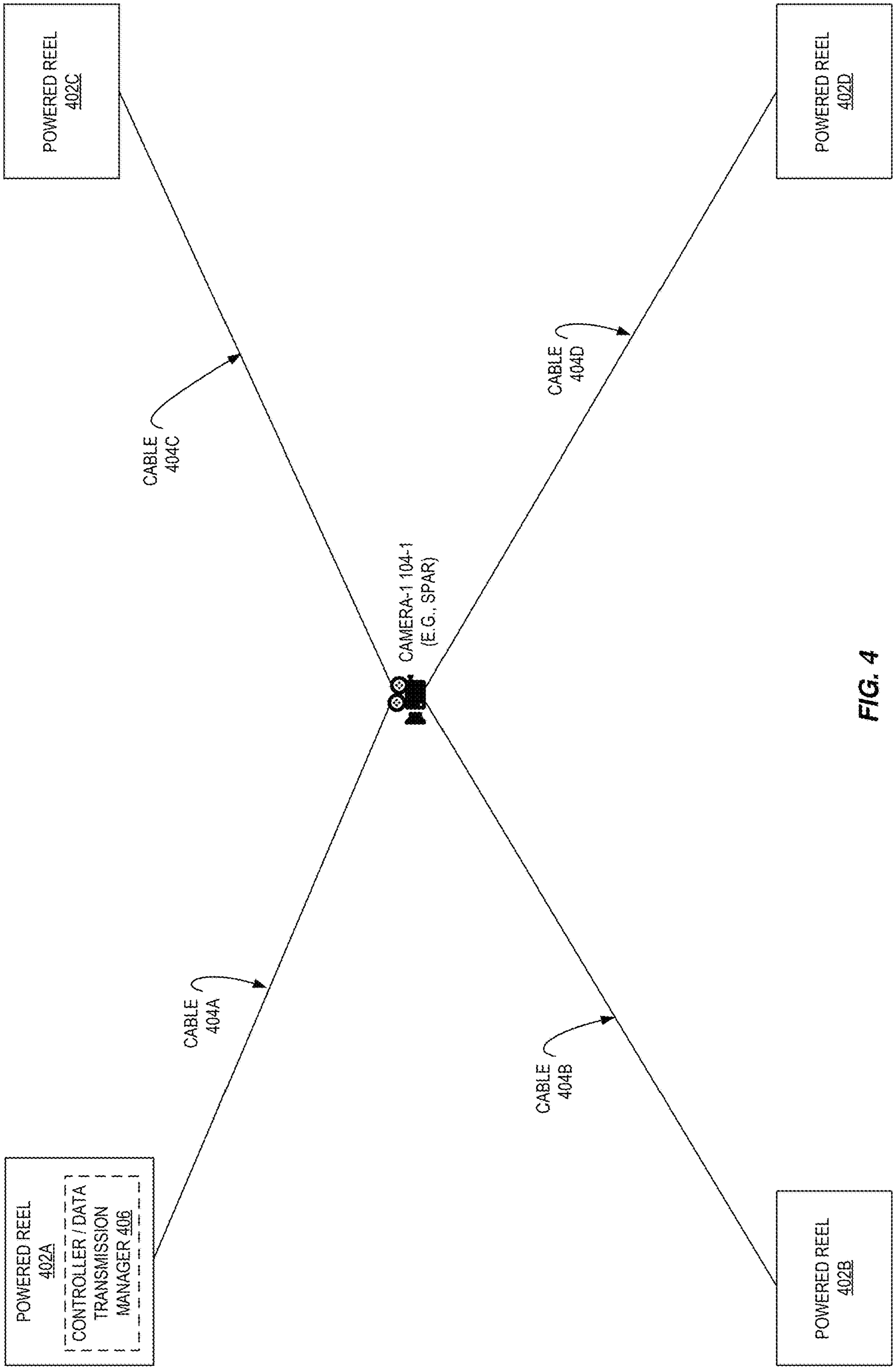
FIG. 4 is a diagram of a camera that is movable by a plurality of powered reels according to some examples.

FIG. 4 is a diagram of a (e.g., Skycam brand) camera 104-1 (e.g., spar including the camera) that is movable by a plurality of powered reels 402A, 402B, 402C, and/or 402D according to some examples. In certain examples, the movable camera 104-1 includes a (e.g., movement and/or stabilization) controller and/or data transmission manager 406, for example, to send video (e.g., and audio) from the spar, e.g., to a production truck. In certain examples, the camera 104-1 moves vertically with respect to the ground owing to the sag of the support cables 404A, 404B, 404C, and/or 404D (e.g., where the sag adds a third dimensionality to the movement of the camera 104-1). In certain examples, a movable camera uses (e.g., is supported by) only two cables, only three cables, only four cables (e.g., as shown in FIG. 4), etc.

FIG. 5 is a diagram illustrating a first video frame 500 of a shot from a movable camera in a first location with a plurality of points including point 502 and point 504 (e.g., the surface-anchored coordinates thereof), generated by a machine learning model 106A (or 112A), overlaid on a two-dimensional playing surface of a football game according to some examples. In particular, inferred coordinates of point 502 and point 504 are used to overlay graphic 506 onto the football field. In certain examples, the graphic 506 is overlayed on the field but not over a player (e.g., or other object).

FIG. 6 is a diagram illustrating a second video frame 600 of the (e.g., single) shot from the movable camera from FIG. 5 in a second different location (e.g., along with and panning, tiling, and zooming of the camera for the play) with a proper subset of the points (e.g., the surface-anchored coordinates thereof) including point 502 and point 504, generated by the machine learning model 106A (or 112A), overlaid on the two-dimensional playing surface of the football game according to some examples.

FIG. 7 is a diagram illustrating a video frame 700 with a plurality of points, generated by a machine learning model, overlaid on a playing surface of a football game with an inference from the machine learning model 106A (or 112A) for each point of a vertical (e.g., from an end zone) surface-anchored coordinate (e.g., Y-coordinate), a lateral (e.g., from a sideline) surface-anchored coordinate (e.g., X-coordinate), and a visibility probability according to some examples. For example, point 702 is inferred to be at the $30^{th}$ yard line, 10 yards from the left sideline, and a visibility probability in this frame of 1.00, e.g., a three-element vector of [30, 10, 1.00].

Figure 8:
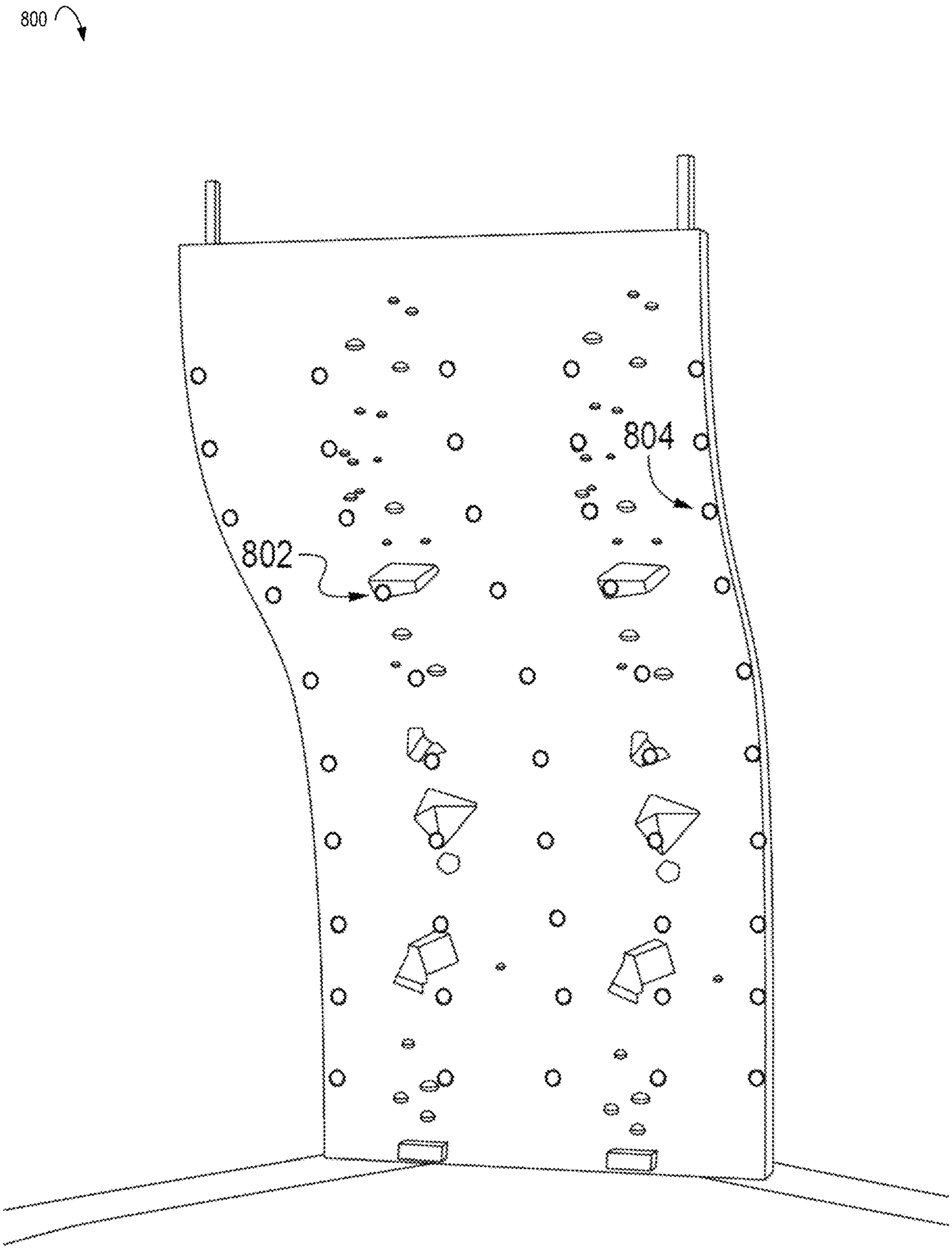
FIG. 8 is a diagram illustrating a first video frame of a shot from a movable camera in a first location with a plurality of points, generated by a machine learning model, overlaid on a three-dimensional surface of a climbing wall according to some examples.

FIG. 8 is a diagram illustrating a first video frame 800 of a shot from a movable camera in a first location with a plurality of points (e.g., the surface-anchored coordinates thereof) including point 802 and point 804, generated by a machine learning model 106A (or 112A), overlaid on a three-dimensional surface of a climbing wall according to some examples.

Figure 9:
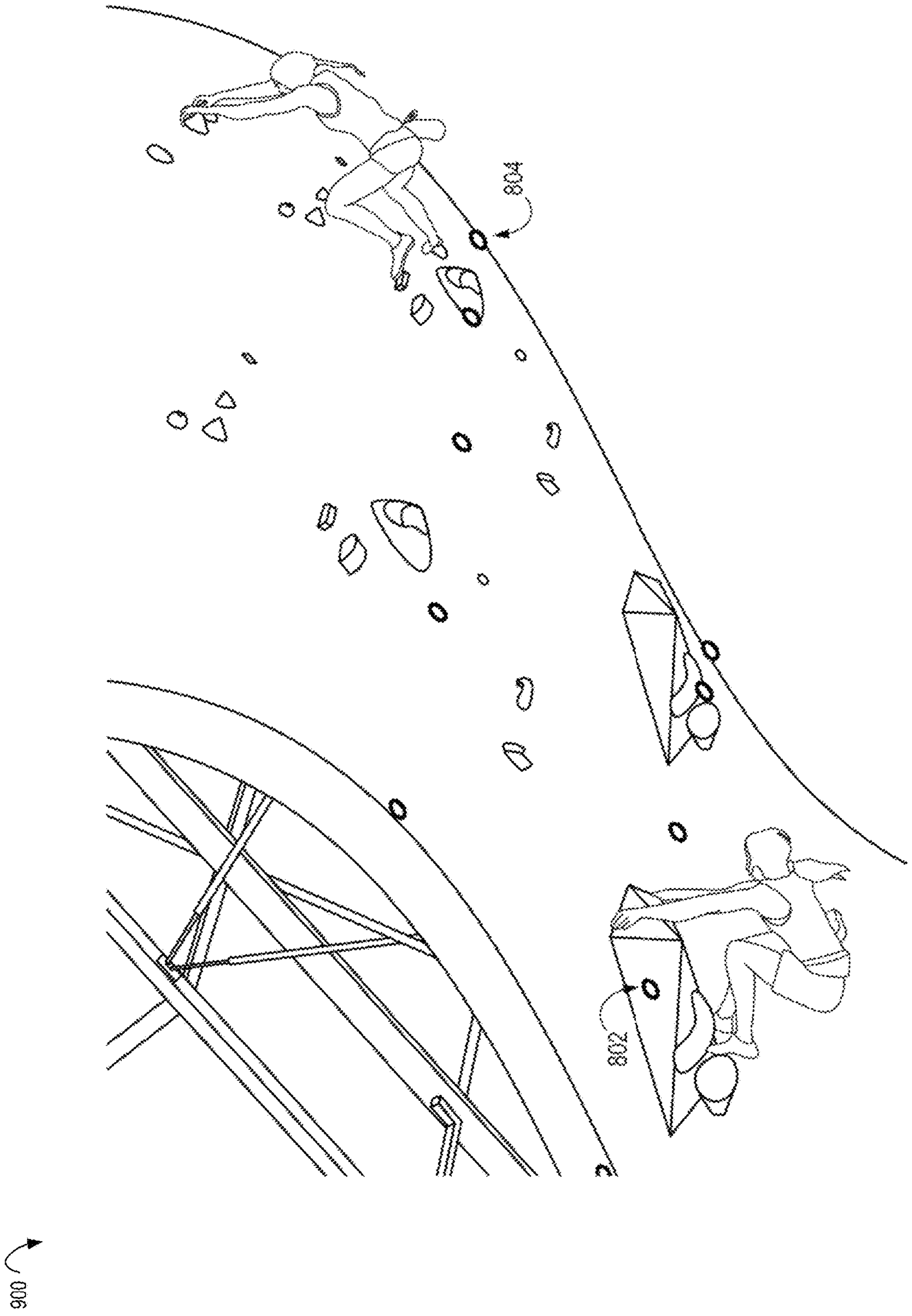
FIG. 9 is a diagram illustrating a second video frame of the shot from the movable camera from FIG. 8 in a second different location with a proper subset of the points, generated by the machine learning model, overlaid on the three-dimensional surface of the climbing wall according to some examples.

FIG. 9 is a diagram illustrating a second video frame 900 of the (e.g., single) shot from the movable camera from FIG. 8 in a second different location (e.g., along with and panning, tiling, and zooming of the camera for the play) with a proper subset of the points including point 802 and point 804 (e.g., the surface-anchored coordinates thereof), generated by the machine learning model 106A (or 112A), overlaid on the three-dimensional surface of the climbing wall according to some examples.

Figure 10:
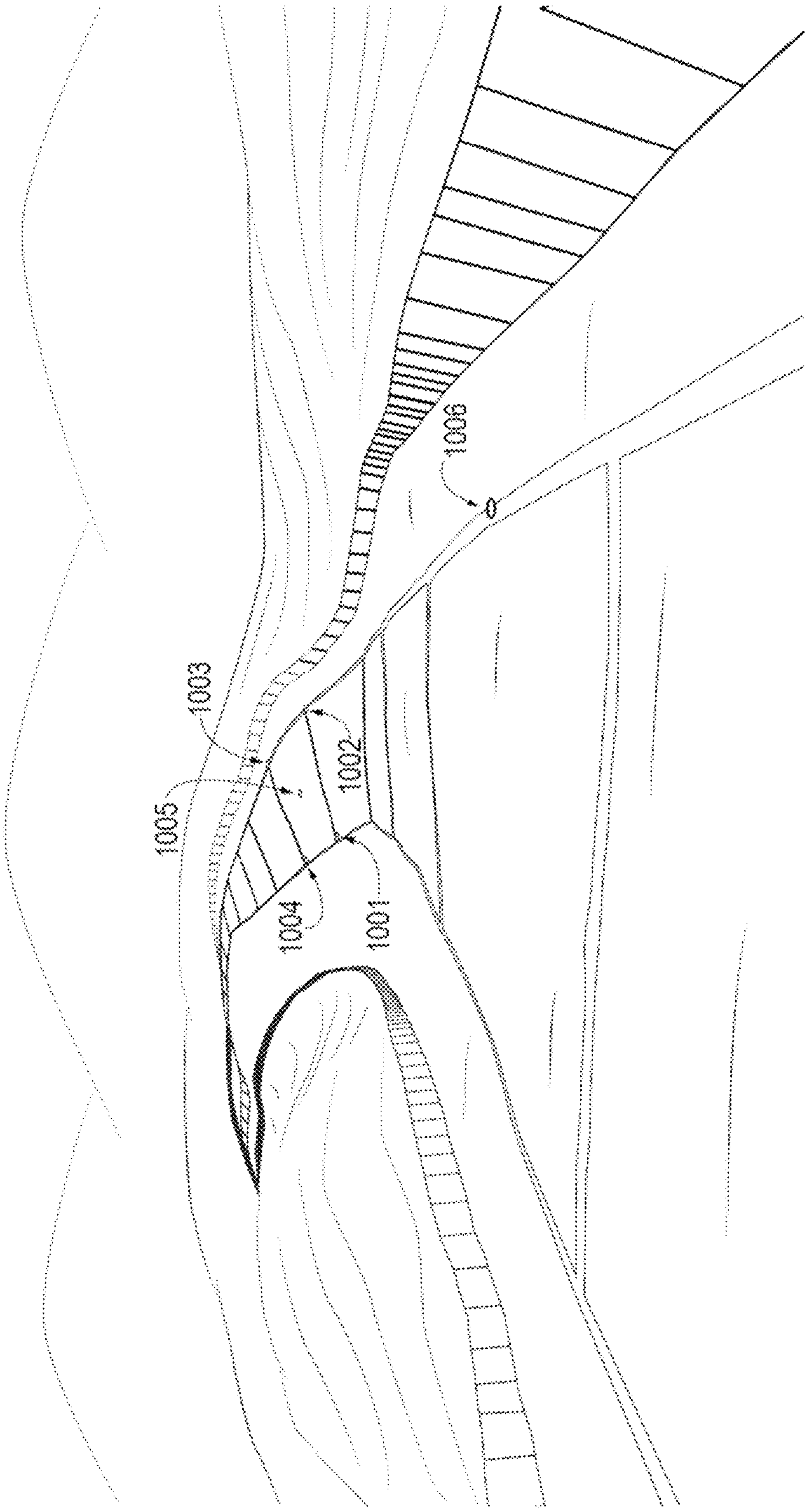
FIG. 10 is a diagram illustrating a first video frame of a shot from a movable camera in a first location with a plurality of points, generated by a machine learning model, overlaid on a three-dimensional surface of a snow skiing course according to some examples.

FIG. 10 is a diagram illustrating a first video frame 1000 of a shot from a movable camera in a first location with a plurality of points including points 1001, 1002, 1003, 1004, 1005, and 1006 (e.g., the surface-anchored coordinates thereof), generated by a machine learning model 106A (or 112A), overlaid on a three-dimensional surface of a snow skiing course (e.g., piste) according to some examples.

Figure 11:
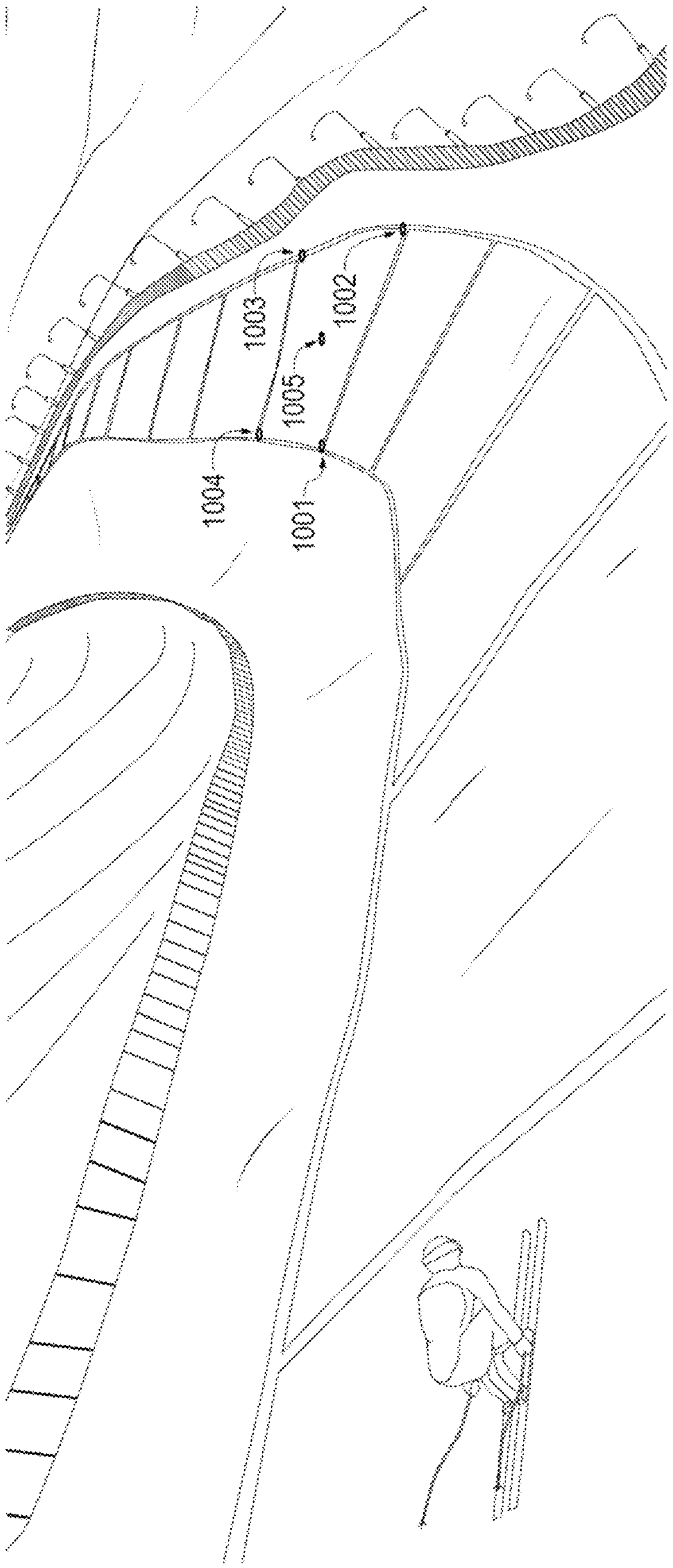
FIG. 11 is a diagram illustrating a second video frame of the shot from the movable camera from FIG. 10 in a second different location with a proper subset of the points, generated by the machine learning model, overlaid on the three-dimensional surface of the snow skiing course according to some examples.

FIG. 11 is a diagram illustrating a second video frame 1100 of the (e.g., single) shot from the movable camera from FIG. 10 in a second different location with a proper subset of the points including points 1001, 1002, 1003, 1004, and 1005 (but not point 1006) (e.g., the surface-anchored coordinates thereof), generated by the machine learning model 106A (or 112A), overlaid on the three-dimensional surface of the snow skiing course according to some examples.

In certain examples, for certain surfaces, the machine learning model 106A (or 112A) is trained to generate an inference for that particular surface, e.g., but any inference therefrom is generated without relying on an on-site pre-event calibration to determine an alignment between the particular surface and a video (e.g., frame) of an event that includes that particular surface. In certain examples, for the two-dimensional surfaces shown in in FIGS. 5-7, the machine learning model 106A (or 112A) is trained to generate an inference of the two-dimensional coordinates (X, Y) and visibility probability for multiple points of that particular surface, e.g., but any inference therefrom is generated without relying on an on-site pre-event calibration to determine an alignment between the particular surface and a video (e.g., frame) of an event that includes that particular surface. In certain examples, for the three-dimensional surfaces shown in in FIGS. 8-11, the machine learning model 106A (or 112A) is trained to generate an inference of the three-dimensional coordinates (X, Y, Z) and visibility probability for multiple points of that particular surface, e.g., but any inference therefrom is generated without relying on an on-site pre-event calibration to determine an alignment between the particular surface and a video (e.g., frame) of an event that includes that particular surface.

Figure 12:
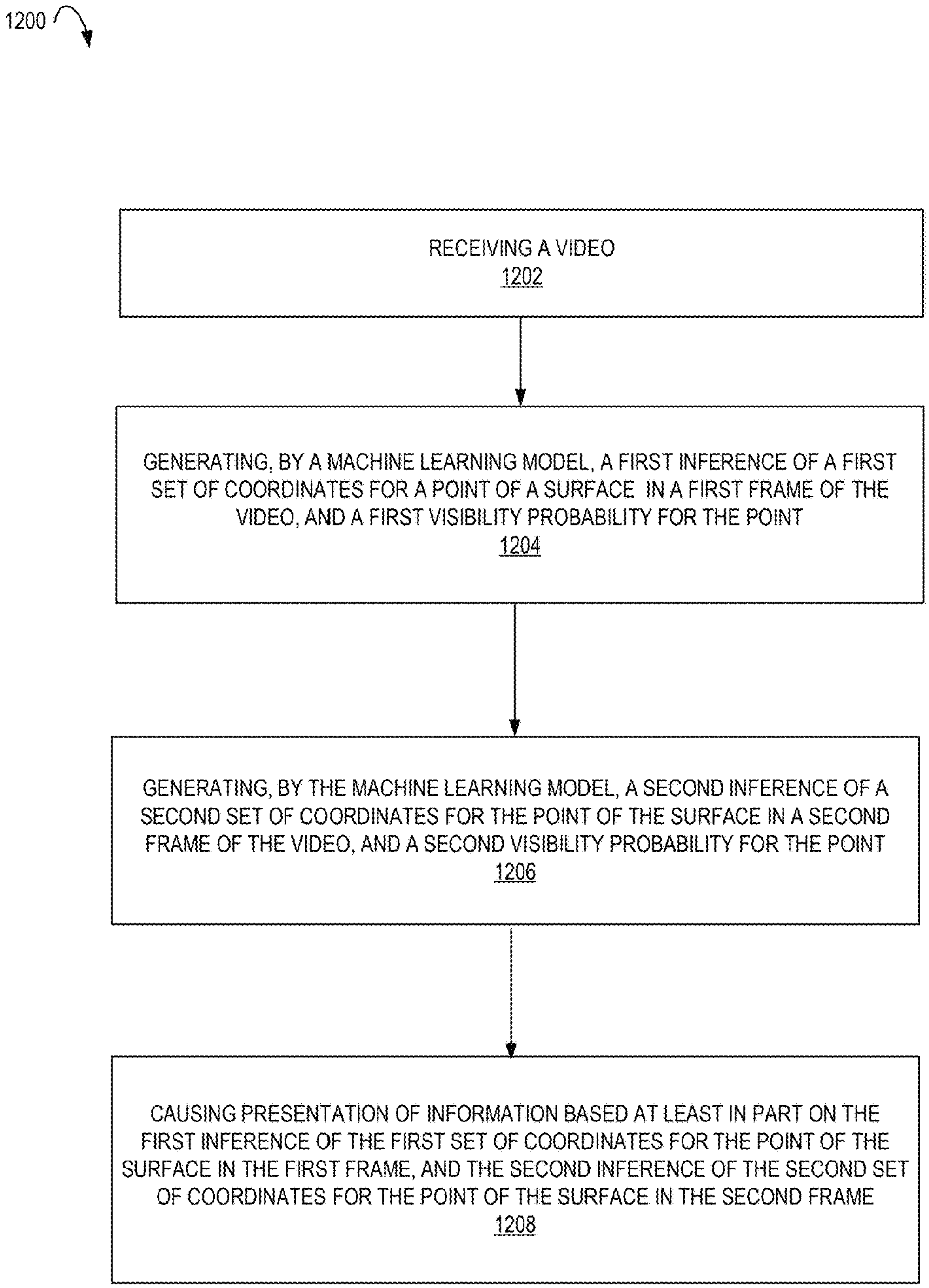
FIG. 12 is a flow diagram illustrating operations of a method of inserting a graphic into a video by a machine learning model according to some examples.

FIG. 12 is a flow diagram illustrating operations 1200 of a method of inserting a graphic into a video by a machine learning model according to some examples. Some or all of the operations 1200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1200 are performed by a production service/system of the other figures (e.g., production service/system 108).

The operations 1200 include, at block 1202, receiving a video (e.g., of an event). The operations 1200 further include, at block 1204, generating, by a machine learning model, a first inference of a first set of coordinates for a point of a surface in a first frame of the video, and a first visibility probability for the point. The operations 1200 further include, at block 1206, generating, by the machine learning model, a second inference of a second set of coordinates for the point of the surface in a second frame of the video, and a second visibility probability for the point. The operations 1200 further include, at block 1208, causing presentation of information (e.g., inserting a graphic into the first frame and the second frame of the video) based at least in part on the first inference of the first set of coordinates for the point of the surface in the first frame, and the second inference of the second set of coordinates for the point of the surface in the second frame. In certain examples, the information is based on the physical location (e.g., physical distance) for one or more points (e.g., surface-anchored coordinates of a corresponding point) and/or is used generate one or more metrics, e.g., speed of a baseball, speed of a runner, etc. In certain examples, these one or more metrics are used to generate a corresponding graphic, e.g., for insertion into the video. In certain examples, the causing presentation of the information (e.g., the graphic) comprises adding the information (e.g., the graphic) into the video (e.g., live stream). In certain examples, the causing presentation of the information (e.g., the graphic) is not presented in the video (e.g., live stream) itself, for example, the information (e.g., the graphic) is presented on a second device, e.g., AR headset, VR headset, phone, and/or audio system. In some examples, an indication of the action is embedded in the video in an imperceptible way (e.g., inaudible tone, that the second devices uses it to determine what to present).

At least some examples of the disclosed technologies can be described in view of the following examples:

Example 1. A computer-implemented method comprising:

receiving, at an on-site production service, a live stream of an event;

generating, by a machine learning model of the on-site production service, a first inference of a first set of surface-anchored coordinates for a plurality of points of a playing surface of the event in a first frame of the live stream, and a first set of visibility probabilities for the plurality of points;

generating, by the machine learning model of the on-site production service, a second inference of a second set of surface-anchored coordinates for at least one of the plurality of points of the playing surface of the event in a second frame of the live stream, and a second visibility probability for the at least one of the plurality of points; and inserting, by the on-site production service, a graphic into the first frame and the second frame of the live stream based at least in part on the first inference of the first set of surface-anchored coordinates for the plurality of points of the playing surface of the event in the first frame, and the second inference of the second set of surface-anchored coordinates for the at least one of the plurality of points of the playing surface of the event in the second frame.

Example 2. The computer-implemented method of example 1, wherein the live stream is from a three-dimensionally movable camera, and a location of the three-dimensionally movable camera that generates the first frame is different in each of three-dimensions from a location of the three-dimensionally movable camera that generates the second frame.

Example 3. The computer-implemented method of example 1, wherein the generating the first inference, the generating the second inference, and the inserting are in real time.

Example 4. A computer-implemented method comprising:

receiving a video;

generating, by a machine learning model, a first inference of a first set of coordinates for a point of a surface in a first frame of the video, and a first visibility probability for the point;

generating, by the machine learning model, a second inference of a second set of coordinates for the point of the surface in a second frame of the video, and a second visibility probability for the point; and causing presentation of information based at least in part on the first inference of the first set of coordinates for the point of the surface in the first frame, and the second inference of the second set of coordinates for the point of the surface in the second frame.

Example 5. The computer-implemented method of example 4, wherein the video is from a three-dimensionally movable camera, and a location of the three-dimensionally movable camera that generates the first frame is different in each of three-dimensions from a location of the three-dimensionally movable camera that generates the second frame (e.g., where the three-dimensionally movable camera can change its focal length and/or its viewing direction).

Example 6. The computer-implemented method of example 5, wherein the three-dimensionally movable camera is a cable-suspended movable camera.

Example 7. The computer-implemented method of example 4, wherein the causing presentation of the information comprises inserting a graphic into the first frame and the second frame of the video based at least in part on the first inference of the first set of coordinates for the point of the surface in the first frame, and the second inference of the second set of coordinates for the point of the surface in the second frame.

Example 8. The computer-implemented method of example 4, wherein the surface is a three-dimensional surface.

Example 9. The computer-implemented method of example 4, wherein the machine learning model includes a class to classify visibility of the point in a frame in real time, and the generating the first inference and the generating the second inference are in real time.

Example 10. The computer-implemented method of example 9, wherein the machine learning model is a residual network comprising an output of the class.

Example 11. The computer-implemented method of example 4, wherein the generating the first inference and the generating the second inference are performed by a computing system of a production truck.

Example 12. The computer-implemented method of example 11, wherein the causing the presentation of the information is performed by the computing system of the production truck.

Example 13. The computer-implemented method of example 4, wherein:

the first inference further comprises a corresponding set of coordinates for a first plurality of points including the point, and a corresponding visibility probability for each of the first plurality of points; and the second inference further comprises a corresponding set of coordinates for a second different plurality of points including the point, and a corresponding visibility probability for each of the second plurality of points.

Example 14. The computer-implemented method of example 13, further comprising displaying the first plurality of points on the first frame and the second plurality of points on the second frame.

Example 15. The computer-implemented method of example 4, wherein the generating the first inference and the generating the second inference do not generate any homographic transformation parameters.

Example 16. The computer-implemented method of example 4, wherein the generating the first inference and the generating the second inference do not rely on an on-site pre-event calibration to determine an alignment between the surface and the video.

Example 17. The computer-implemented method of example 4, wherein the generating the first inference and the generating the second inference do not utilize pan, tilt, and zoom measurements from a camera generating the video.

Example 18. A non-transitory computer-readable medium storing code that, when executed by a device, causes the device to perform a method comprising:

receiving a video;

generating, by a machine learning model, a first inference of a first set of coordinates for a point of a surface in a first frame of the video, and a first visibility probability for the point;

generating, by the machine learning model, a second inference of a second set of coordinates for the point of the surface in a second frame of the video, and a second visibility probability for the point; and causing presentation of information based at least in part on the first inference of the first set of coordinates for the point of the surface in the first frame, and the second inference of the second set of coordinates for the point of the surface in the second frame.

Example 19. The non-transitory computer-readable medium of example 18, wherein the video is from a three-dimensionally movable camera, and a location of the three-dimensionally movable camera that generates the first frame is different in each of three-dimensions from a location of the three-dimensionally movable camera that generates the second frame (e.g., where the three-dimensionally movable camera can change its focal length and/or its viewing direction).

Example 20. The non-transitory computer-readable medium of example 18, wherein the causing presentation of the information comprises inserting a graphic into the first frame and the second frame of the video based at least in part on the first inference of the first set of coordinates for the point of the surface in the first frame, and the second inference of the second set of coordinates for the point of the surface in the second frame.

Example 21. The non-transitory computer-readable medium of example 18, wherein the machine learning model includes a class to classify visibility of the point in a frame in real time, and the generating the first inference and the generating the second inference are in real time.

Example 22. The non-transitory computer-readable medium of example 18, wherein:

the first inference further comprises a corresponding set of coordinates for a first plurality of points including the point, and a corresponding visibility probability for each of the first plurality of points; and the second inference further comprises a corresponding set of coordinates for a second different plurality of points including the point, and a corresponding visibility probability for each of the second plurality of points.

Example 23. The non-transitory computer-readable medium of example 22, wherein the method further comprises displaying the first plurality of points on the first frame and the second plurality of points on the second frame.

Exemplary environments, systems, etc. that the above may be used in are detailed below.

Figure 13:
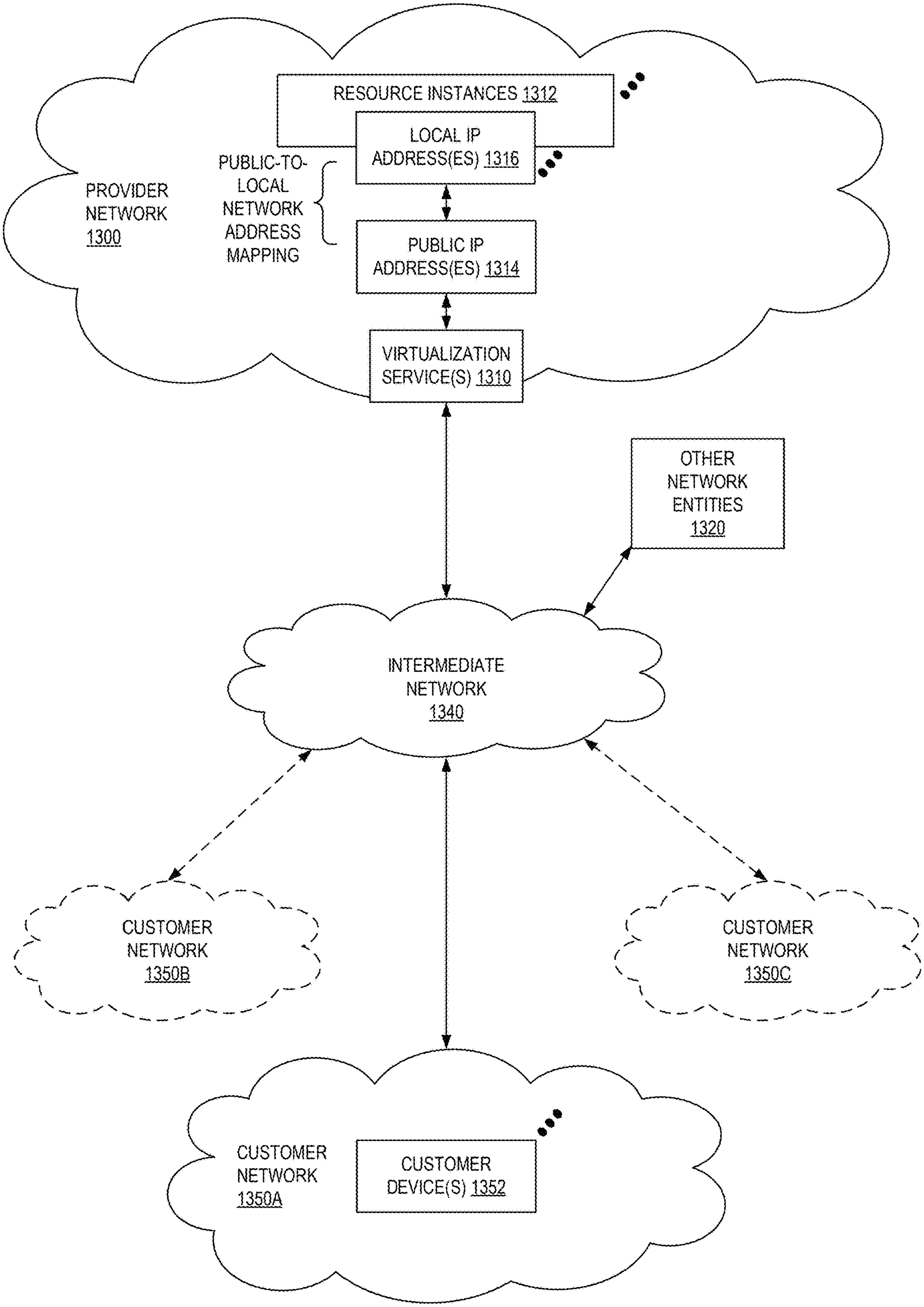
FIG. 13 illustrates an example provider network environment according to some examples.

FIG. 13 illustrates an example provider network (or "service provider system") environment according to some examples. A provider network 1300 may provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 may be associated with the resource instances 1312; the local IP addresses are the internal network addresses of the resource instances 1312 on the provider network 1300. In some examples, the provider network 1300 may also provide public IP addresses 1314 and/or public IP address ranges (e.g., Internet Protocol version 4 (IPv4) or Internet Protocol version 6 (IPv6) addresses) that customers may obtain from the provider 1300.

Conventionally, the provider network 1300, via the virtualization services 1310, may allow a customer of the service provider (e.g., a customer that operates one or more client networks 1350A-1350C including one or more customer device(s) 1352) to dynamically associate at least some public IP addresses 1314 assigned or allocated to the customer with particular resource instances 1312 assigned to the customer. The provider network 1300 may also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of customer network(s) 1350A-1350C may, for example, implement customer-specific applications and present the customer's applications on an intermediate network 1340, such as the Internet. Other network entities 1320 on the intermediate network 1340 may then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 may be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1300; a customer may then assign their allocated public IP addresses to particular resource instances allocated to the customer. These public IP addresses may be referred to as customer public IP addresses, or simply customer IP addresses. Instead of being assigned by the provider network 1300 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
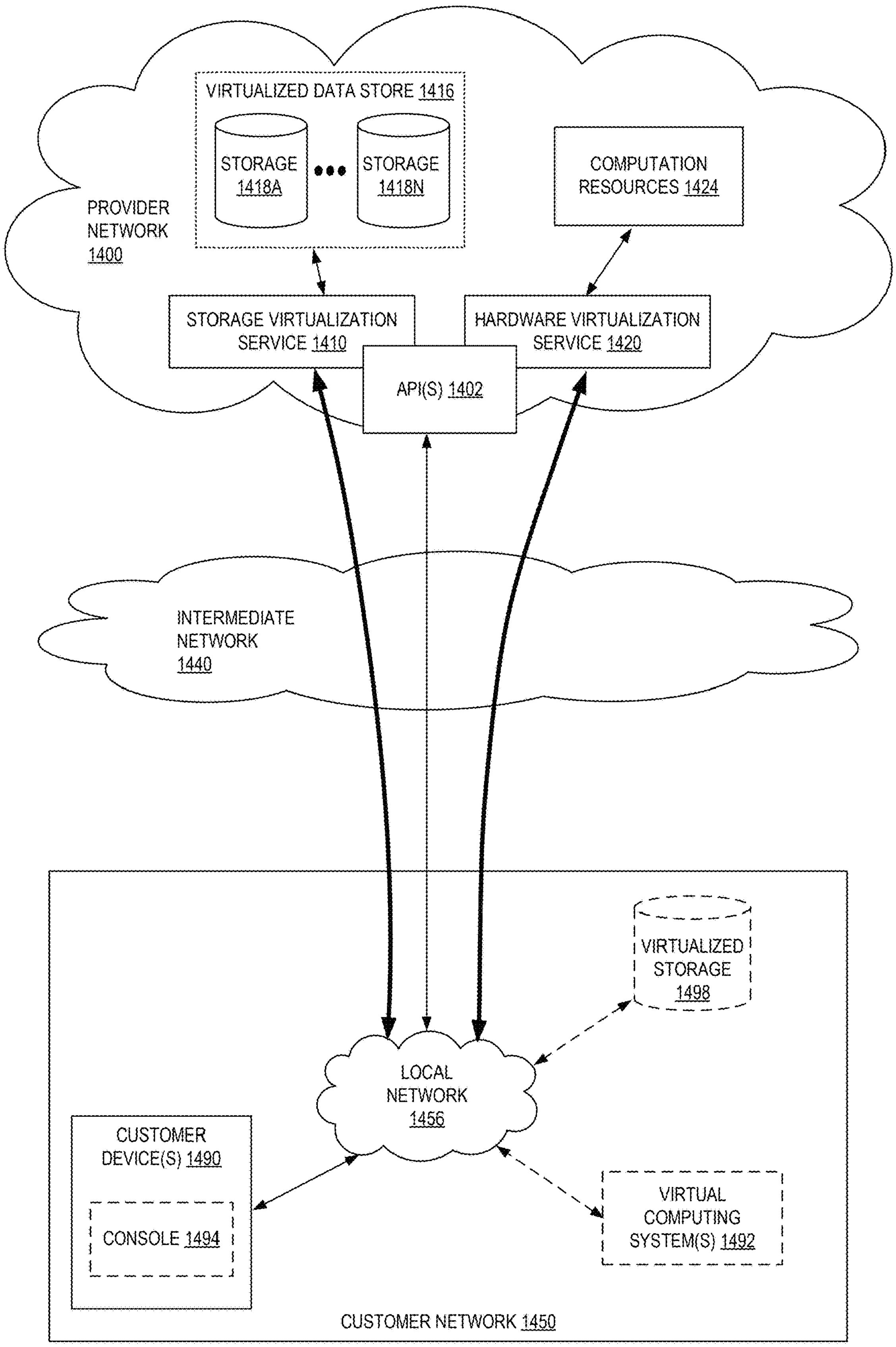
FIG. 14 is a block diagram of an example provider network that provides a storage service and a hardware virtualization service to customers according to some examples.

FIG. 14 is a block diagram of an example provider network that provides a storage service and a hardware virtualization service to customers, according to some examples. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some examples, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some examples, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage service 1410, for example via one or more APIs 1402, to access data from and store data to storage resources 1418A-1418N of a virtual data store 1416 (e.g., a folder or "bucket", a virtualized volume, a database, etc.) provided by the provider network 1400. In some examples, a virtualized data store gateway (not shown) may be provided at the customer network 1450 that may locally cache at least some data, for example frequently-accessed or critical data, and that may communicate with storage service 1410 via one or more communications channels to upload new or modified data from a local cache so that the primary store of data (virtualized data store 1416) is maintained. In some examples, a user, via a virtual computing system 1492 and/or on another customer device 1490, may mount and access virtual data store 1416 volumes via storage service 1410 acting as a storage virtualization service, and these volumes may appear to the user as local (virtualized) storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Illustrative System

Figure 15:
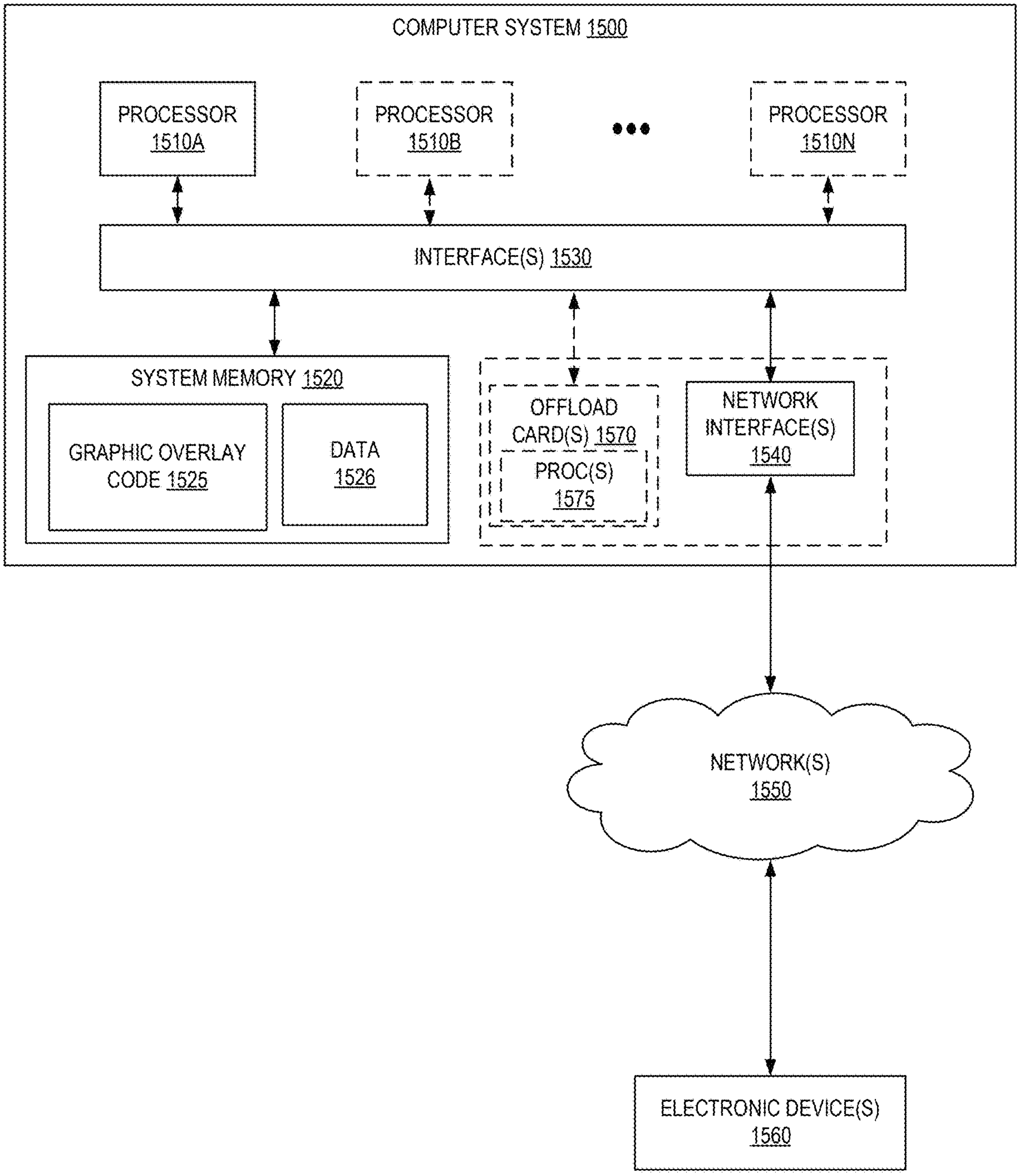
FIG. 15 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1500 illustrated in FIG. 15. In the illustrated example, computer system 1500 includes one or more processors 1510 coupled to a system memory 1520 via an input/output (I/O) interface 1530. Computer system 1500 further includes a network interface 1540 coupled to I/O interface 1530. While FIG. 15 shows computer system 1500 as a single computing device, in various examples a computer system 1500 may include one computing device or any number of computing devices configured to work together as a single computer system 1500.

In various examples, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various examples, processors 1510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1510 may commonly, but not necessarily, implement the same ISA.

System memory 1520 may store instructions and data accessible by processor(s) 1510. In various examples, system memory 1520 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1520 as graphic overlay code 1525 (e.g., executable to implement, in whole or in part, the operations discussed herein) and data 1526.

In one example, I/O interface 1530 may be configured to coordinate I/O traffic between processor 1510, system memory 1520, and any peripheral devices in the device, including network interface 1540 or other peripheral interfaces. In some examples, I/O interface 1530 may perform any necessary protocol, timing, or other data transformations to convert data signals from one component (e.g., system memory 1520) into a format suitable for use by another component (e.g., processor 1510). In some examples, I/O interface 1530 may include support for devices attached through various types of peripheral buses, such as a variant of the Peripheral Component Interconnect (PCI) bus standard or the Universal Serial Bus (USB) standard, for example. In some examples, the function of I/O interface 1530 may be split into two or more separate components, such as a north bridge and a south bridge, for example. Also, in some examples some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIG. 1, for example. In various examples, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1500 includes one or more offload cards 1570 (including one or more processors 1575, and possibly including the one or more network interfaces 1540) that are connected using an I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1500 may act as a host electronic device (e.g., operating as part of a hardware virtualization service) that hosts compute instances, and the one or more offload cards 1570 execute a virtualization manager that can manage compute instances that execute on the host electronic device. As an example, in some examples the offload card(s) 1570 can perform compute instance management operations such as pausing and/or un-pausing compute instances, launching and/or terminating compute instances, performing memory transfer/copying operations, etc. These management operations may, in some examples, be performed by the offload card(s) 1570 in coordination with a hypervisor (e.g., upon a request from a hypervisor) that is executed by the other processors 1510A-1510N of the computer system 1500. However, in some examples the virtualization manager implemented by the offload card(s) 1570 can accommodate requests from other entities (e.g., from compute instances themselves), and may not coordinate with (or service) any separate hypervisor.

In some examples, system memory 1520 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Figure 16:
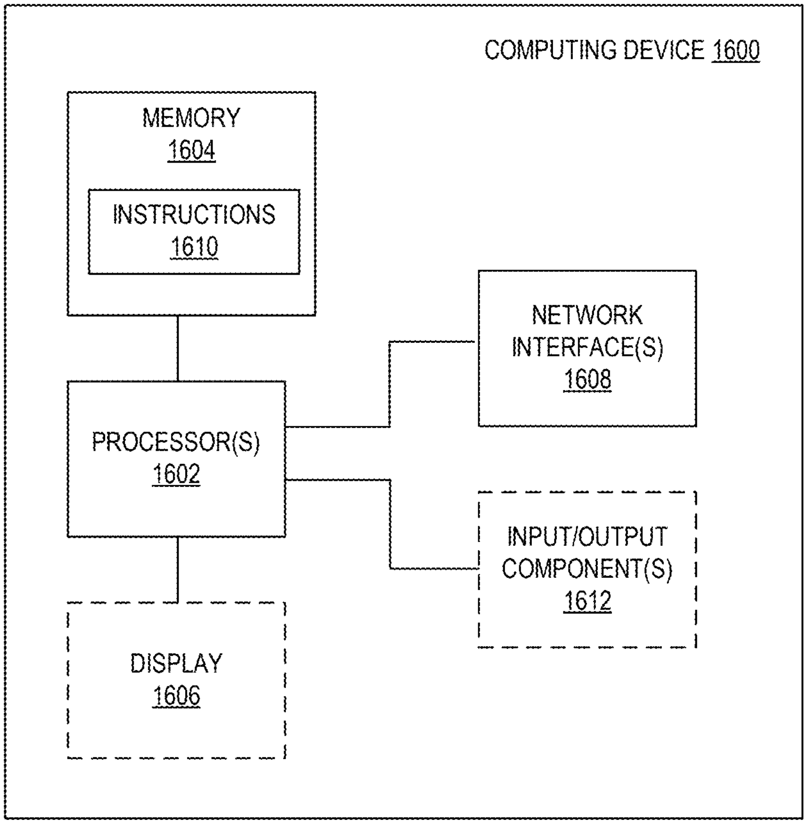
FIG. 16 illustrates a logical arrangement of a set of general components of an exemplary computing device that can be utilized in accordance with various examples.

FIG. 16 illustrates a logical arrangement of a set of general components of an example computing device 1600. Generally, a computing device 1600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1604) to store code (for example, instructions 1610, e.g., which implement a content delivery service as disclosed herein), and a set of one or more wired or wireless network interfaces 1608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1604) of a given electronic device typically stores code (e.g., instructions 1610) for execution on the set of one or more processors 1602 of that electronic device. One or more parts of various examples may be implemented using different combinations of software, firmware, and/or hardware.

A computing device 1600 can include some type of display element 1606, such as a touch screen or liquid crystal display (LCD), although many devices such as portable media players might convey information via other means, such as through audio speakers, and other types of devices such as server end stations may not have a display element 1606 at all. As discussed, some computing devices used in some examples include at least one input and/or output component(s) 1612 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 17:
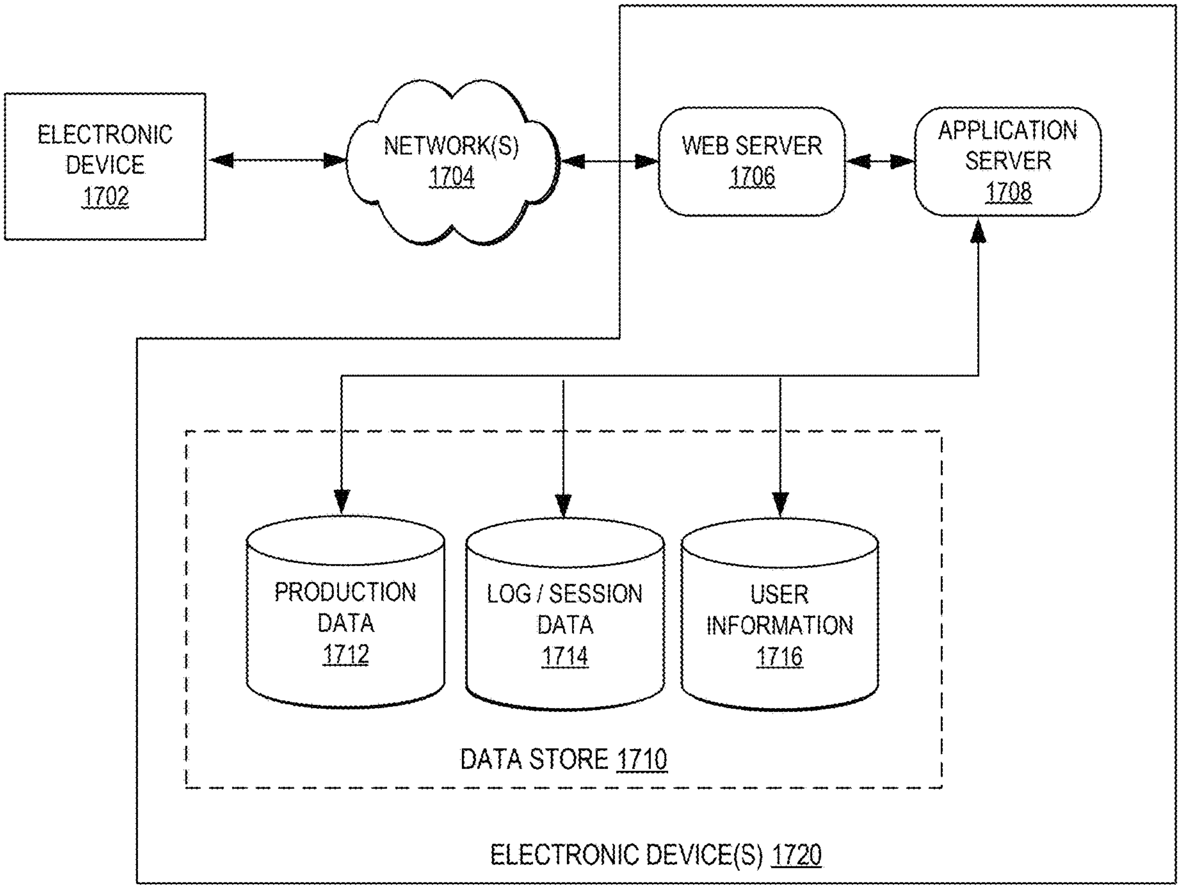
FIG. 17 illustrates an example of an environment for implementing aspects in accordance with various examples.

As discussed, different approaches can be implemented in various environments in accordance with the described examples. For example, FIG. 17 illustrates an example of an environment 1700 for implementing aspects in accordance with various examples. For example, in some examples messages are HyperText Transfer Protocol (HTTP) requests that are received by a web server (e.g., web server 1706), and the users, via electronic devices, may interact with the provider network via a web portal provided via the web server 1706 and application server 1708. As will be appreciated, although a web-based environment is used for purposes of explanation, different environments may be used, as appropriate, to implement various examples. The system includes an electronic client device 1702, which may also be referred to as a client device and can be any appropriate device operable to send and receive requests, messages, or information over an appropriate network 1704 and convey information back to a user of the device 1702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1704 includes the Internet, as the environment includes a web server 1706 for receiving requests and serving content in response thereto, although for other networks an alternative device serving a similar purpose could be used, as would be apparent to one of ordinary skill in the art.

The illustrative environment includes at least one application server 1708 and a data store 1710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1708 can include any appropriate hardware and software for integrating with the data store 1710 as needed to execute aspects of one or more applications for the client device 1702 and handling a majority of the data access and business logic for an application. The application server 1708 provides access control services in cooperation with the data store 1710 and is able to generate content such as text, graphics, audio, video, etc., to be transferred to the client device 1702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1702 and the application server 1708, can be handled by the web server 1706. It should be understood that the web server 1706 and application server 1708 are not required and are merely example components, as structured code discussed herein can be executed on any appropriate device or host machine as discussed elsewhere herein.

The data store 1710 can include several separate data tables, databases, or other data storage mechanisms and media for storing data relating to a particular aspect. For example, the data store illustrated includes mechanisms for storing production data 1712 and user information 1716, which can be used to serve content for the production side. The data store 1710 also is shown to include a mechanism for storing log or session data 1714. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update, or otherwise process data in response thereto. In one example, a user might submit a search request for a certain type of item. In this case, the data store 1710 might access the user information 1716 to verify the identity of the user and can access a production data 1712 to obtain information about items of that type. The information can then be returned to the user, such as in a listing of results on a web page that the user is able to view via a browser on the user device 1702. Information for a particular item of interest can be viewed in a dedicated page or window of the browser.

The web server 1706, application server 1708, and/or data store 1710 may be implemented by one or more electronic devices 1720, which can also be referred to as electronic server devices or server end stations, and may or may not be located in different geographic locations. Each of the one or more electronic devices 1720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the environment 1700 in FIG. 17 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1418A-1418N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "a certain example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving, at an on-site production service, a live stream of an event;

generating, by a machine learning model of the on-site production service, a first inference of a first set of surface-anchored coordinates for a plurality of points of a playing surface of the event in a first frame of the live stream, and a first set of visibility probabilities for the plurality of points;

generating, by the machine learning model of the on-site production service, a second inference of a second set of surface-anchored coordinates for at least one of the plurality of points of the playing surface of the event in a second frame of the live stream, and a second visibility probability for the at least one of the plurality of points; and inserting, by the on-site production service, a graphic into the first frame and the second frame of the live stream based at least in part on the first inference of the first set of surface-anchored coordinates for the plurality of points of the playing surface of the event in the first frame, and the second inference of the second set of surface-anchored coordinates for the at least one of the plurality of points of the playing surface of the event in the second frame, wherein the live stream is from a three-dimensionally movable camera, and a location of the three-dimensionally movable camera that generates the first frame is different in each of three-dimensions from a location of the three-dimensionally movable camera that generates the second frame.

2. The computer-implemented method of claim 1, wherein the generating the first inference, the generating the second inference, and the inserting are in real time.

3. A computer-implemented method comprising:

receiving a video;

generating, by a machine learning model, a first inference of a first set of coordinates for a point of a surface in a first frame of the video, and a first visibility probability for the point;

generating, by the machine learning model, a second inference of a second set of coordinates for the point of the surface in a second frame of the video, and a second visibility probability for the point; and causing presentation of information based at least in part on the first inference of the first set of coordinates for the point of the surface in the first frame, and the second inference of the second set of coordinates for the point of the surface in the second frame, wherein the video is from a three-dimensionally movable camera, and a location of the three-dimensionally movable camera that generates the first frame is different in each of three-dimensions from a location of the three-dimensionally movable camera that generates the second frame.

4. The computer-implemented method of claim 3, wherein the three-dimensionally movable camera is a cable-suspended movable camera.

5. The computer-implemented method of claim 3, wherein the causing presentation of the information comprises inserting a graphic into the first frame and the second frame of the video based at least in part on the first inference of the first set of coordinates for the point of the surface in the first frame, and the second inference of the second set of coordinates for the point of the surface in the second frame.

6. The computer-implemented method of claim 3, wherein the surface is a three-dimensional surface.

7. The computer-implemented method of claim 3, wherein the machine learning model includes a class to classify visibility of the point in a frame in real time, and the generating the first inference and the generating the second inference are in real time.

8. The computer-implemented method of claim 7, wherein the machine learning model is a residual network comprising an output of the class.

9. The computer-implemented method of claim 3, wherein the generating the first inference and the generating the second inference are performed by a computing system of a production truck.

10. The computer-implemented method of claim 9, wherein the causing the presentation of the information is performed by the computing system of the production truck.

11. The computer-implemented method of claim 3, wherein:

the first inference further comprises a corresponding set of coordinates for a first plurality of points including the point, and a corresponding visibility probability for each of the first plurality of points; and the second inference further comprises a corresponding set of coordinates for a second different plurality of points including the point, and a corresponding visibility probability for each of the second plurality of points.

12. The computer-implemented method of claim 11, further comprising displaying the first plurality of points on the first frame and the second plurality of points on the second frame.

13. A non-transitory computer-readable medium storing code that, when executed by a device, causes the device to perform a method comprising:

receiving a video;

generating, by a machine learning model, a first inference of a first set of coordinates for a point of a surface in a first frame of the video, and a first visibility probability for the point;

generating, by the machine learning model, a second inference of a second set of coordinates for the point of the surface in a second frame of the video, and a second visibility probability for the point; and causing presentation of information based at least in part on the first inference of the first set of coordinates for the point of the surface in the first frame, and the second inference of the second set of coordinates for the point of the surface in the second frame, wherein the video is from a three-dimensionally movable camera, and a location of the three-dimensionally movable camera that generates the first frame is different in each of three-dimensions from a location of the three-dimensionally movable camera that generates the second frame.

14. The non-transitory computer-readable medium of claim 13, wherein the causing presentation of the information comprises inserting a graphic into the first frame and the second frame of the video based at least in part on the first inference of the first set of coordinates for the point of the surface in the first frame, and the second inference of the second set of coordinates for the point of the surface in the second frame.

15. The non-transitory computer-readable medium of claim 13, wherein the machine learning model includes a class to classify visibility of the point in a frame in real time, and the generating the first inference and the generating the second inference are in real time.

16. The non-transitory computer-readable medium of claim 13, wherein:

the first inference further comprises a corresponding set of coordinates for a first plurality of points including the point, and a corresponding visibility probability for each of the first plurality of points; and the second inference further comprises a corresponding set of coordinates for a second different plurality of points including the point, and a corresponding visibility probability for each of the second plurality of points.

17. The non-transitory computer-readable medium of claim 16, wherein the method further comprises displaying the first plurality of points on the first frame and the second plurality of points on the second frame.

18. A computer-implemented method comprising:

receiving a video;

generating, by a machine learning model, a first inference of a first set of coordinates for a point of a surface in a first frame of the video, and a first visibility probability for the point;

generating, by the machine learning model, a second inference of a second set of coordinates for the point of the surface in a second frame of the video, and a second visibility probability for the point; and causing presentation of information based at least in part on the first inference of the first set of coordinates for the point of the surface in the first frame, and the second inference of the second set of coordinates for the point of the surface in the second frame, wherein the generating the first inference and the generating the second inference are performed by a computing system of a production truck.

19. The computer-implemented method of claim 18, wherein the causing the presentation of the information is performed by the computing system of the production truck.

20. The computer-implemented method of claim 18, wherein the video is from a three-dimensionally movable camera, and a location of the three-dimensionally movable camera that generates the first frame is different in each of three-dimensions from a location of the three-dimensionally movable camera that generates the second frame.

* * * * *